(12) United States Patent
Campbell

(10) Patent No.: US 11,476,630 B1
(45) Date of Patent: Oct. 18, 2022

(54) THIN FILM BREWSTER COUPLING DEVICE

(71) Applicant: Robert Neil Campbell, Corrales, NM (US)

(72) Inventor: Robert Neil Campbell, Corrales, NM (US)

( * ) Notice: Subject to any disclaimer, the term of this patent is extended or adjusted under 35 U.S.C. 154(b) by 8 days.

(21) Appl. No.: 17/336,230

(22) Filed: Jun. 1, 2021

(51) Int. Cl.
  *H01S 3/034* (2006.01)
  *H01S 3/0943* (2006.01)
  *H01S 3/102* (2006.01)
  *H01S 3/10* (2006.01)

(52) U.S. Cl.
  CPC .......... *H01S 3/034* (2013.01); *H01S 3/0943* (2013.01); *H01S 3/1022* (2013.01); *H01S 3/10061* (2013.01)

(58) Field of Classification Search
  CPC .... H01S 3/034; H01S 3/10061; H01S 3/1022; H01S 3/0943
  See application file for complete search history.

(56) References Cited

U.S. PATENT DOCUMENTS

| | | | |
|---|---|---|---|
| 3,704,934 | A | 12/1972 | Holmes et al. |
| 4,052,681 | A | 10/1977 | Bulthuis et al. |
| 4,208,636 | A | 6/1980 | German |
| 4,515,441 | A | 5/1985 | Wentz |
| 6,416,816 | B2 | 7/2002 | Veerasamy et al. |
| 7,164,530 | B2 | 1/2007 | Muraguchi et al. |
| 8,817,371 | B1 | 8/2014 | Boothroyd et al. |
| 10,797,466 | B2 | 10/2020 | Campbell |
| 2008/0037094 | A1* | 2/2008 | Hwang ............... G02B 5/3058 359/487.03 |
| 2008/0037609 | A1* | 2/2008 | Nagai .................... H01S 3/034 372/57 |
| 2011/0052837 | A1* | 3/2011 | Hashimoto ............ B32B 7/023 428/411.1 |

(Continued)

OTHER PUBLICATIONS

D. Tovey et al., "CO2 Laser Optically Pumped by a Tunable 4.3 pm Laser Source," in Conference on Lasers and Electro-Optics, OSA Technical Digest (Optica Publishing Group, 2019), paper STh1E.4 (Year: 2019).*

(Continued)

*Primary Examiner* — Xinning(Tom) Niu
(74) *Attorney, Agent, or Firm* — Iron Gate Intellectual Property, LLC; Andres Salazar

(57) ABSTRACT

A thin film Brewster coupling device configured for low loss transmission of an imposed polarized parallel to plane of incidence 8.5 micron to 11.5 micron wavelength laser beam and simultaneous high reflectivity of a polarized perpendicular to plane of incidence 2 micron to 4 micron wavelength laser beam. The device comprising an optical media substrate and at least one dielectric stack optically coupled to the optical media substrate where the dielectric stack comprises a dielectric layer and an overlayer, the dielectric layer and the overlayer each comprising a thickness of nominally a quarter wavelength of the 2 micron to 4 micron wavelength laser beam, and oriented at near the Brewster Angle to the incident 8.5 micron to 11.5 micron wavelength laser beam. The substrate and dielectric mediums of necessary characteristics to result in low LIDT, high strength, chemical inertness and high thermal conductivity.

15 Claims, 11 Drawing Sheets

(56) References Cited

U.S. PATENT DOCUMENTS

2012/0243566 A1*  9/2012  Hori ................ H01S 3/131
                                              372/27
2014/0286366 A1*  9/2014  Kumazaki ......... H01S 3/034
                                              372/38.05
2015/0109663 A1    4/2015  Gittler et al.

OTHER PUBLICATIONS

Jaroszynski, Campbell, et al., Optical pumped ultra-short pule CO2 lasers as drivers of laser plasma accelerators and other applications, Proceedings vol. 11042, (continued).
(Jaroszynski continued) XXII International Symposium on High Power Laser Systems and Applications, 2019.
Gboyega, et al., Infrared absorption of MgO at high pressures and temperatures: A molecular dynamic study. The Journal of Chemical Physics 131, 014506, 2009.
Degel, Gittler, Multispectral Optical Coatings are Tough, Versitile for IR Applications, Photonics Spectra, Mar. 2013.
Xu et al., Mechanisms of femtosecond laser-induced breakdown and damage in MgO, Optics Communications, 2005.
Oliver, et al., Glancing-Angle-Deposited Magnesium Oxide Films for High-Fluence Applications, copyright Optical Society of America, 2016.
Reilly, et al., Laser Induced Damage Threshold of CVD-Grown Single Crystal Diamond Surfaces with Various Surface Finishes, Advanced Solid State Lasers Conference, 2015.

\* cited by examiner

THIN FILM BREWSTER COUPLING DEVICE

STATEMENT OF GOVERNMENT INTEREST

This invention was made with government support under contract No. N00014-19-C-1048 awarded by the Office of Naval Research. The government has certain rights in the invention.

TECHNICAL FIELD OF THE INVENTION

The present invention relates to multilayer optical devices whose transmissivity and reflectivity characteristics provide for low loss transit and tailored coupling and decoupling of distinct electromagnetic wavelengths.

BACKGROUND OF THE INVENTION $CO_2$ lasers have utility in materials processing, biomedical applications, extreme power light and related physics, and their atmospheric penetration enables standoff sensing and energy transfer. $CO_2$ lasers produce beams in the mid IR spectrum, typically at 9.2 μm to 11 μm in wavelength. This can be further extended down to approximately 8.7 μm and up to approximately 12.3 μm by utilization of rare isotope based molecular isotopologues of $CO_2$. Additionally, at raised pressure, given sustainable employment of arbitrarily engineered, in species and proportion, mixes of $CO_2$ molecular isotopologues, ultrashort pulse applications at these wavelengths can be also accessed. Sub-picosecond function is theoretically viable. The raised pressure is necessitated by the need to pressure broaden the $CO_2$ ro-vibrational transitions to the point they overlap, in which case the standard line emission gain distribution transitions to a continuum of useful spectral extent. The facility to sustainably employ arbitrarily engineered mixes of $CO_2$ molecular isotopologues lowers the threshold pressure requirement for continuous tunability.

Conventional $CO_2$ lasers are capable of high power and are simple to pump, albeit the pump methodology conveys constraints inherent to its functional mode. The current conventional pump method is discharge excitation. Broadly volumetric energy extraction capability scales with the density of energized gain medium molecules present in the beam path within the laser cavity, as does amplification, for a given system net pressure. Thus, higher $CO_2$ gas pressures, or partial pressures, pumped to equivalent, or greater, population inversions typical of standard lower pressure $CO_2$ lasers, are therefore desired in order to achieve higher volumetric extractions measured in, for example, Joules per Liter.

However, achieving increased performance, inclusive of system efficiency as manifested by wall plug efficiency, system physical volume, system consumable use and system volumetric extraction by attempting to simply scale these parameters, restricting consideration to the discharge excitation methodology, and thus, via adjustment of discharge characteristics is significantly limited by the physical constraints intrinsic to that current predominant pump method.

Expressed alternatively, current discharge-based $CO_2$ laser technology's development cycle is exhausted. Only limited incremental advances can be made, and they typically require concessions in one area of the performance envelope for any gain in another, as the performance/ capability ceilings of these devices are well established and represent near intractable behavioral constraints. These limited incremental advances require, should they be attempted, disproportionate investiture in time and capital.

This predominantly held view of the technology, and therefore where it is going and perhaps what opportunity it presents, has naturally impacted related optics development. Specifically, the Laser Induced Damage Threshold (LIDT) of the thin film coated optics broadly utilized has not improved over decades, and largely the same substrates are employed, with generally the same deficiencies. Certainly, specialized application optical devices of the nature presented in this application, representing a miniscule fringe interest, have not been attempted.

For example, whether transversely or longitudinally discharge excited, in general the greater the discharge length required, the greater the voltage required to engender a discharge and this rapidly becomes a completely impractical scaling impediment. Scaling pressure up equally scales up the threshold discharge voltage required. Scaling both aperture (discharge length) and pressure then clearly seriously exacerbates the voltage requirement. Indeed, the only high-pressure $CO_2$ lasers in existence are transient pulsed transversely excited devices and their attainable pressures hover in the vicinity of 10 to 20 atmospheres. In addition, there is certainly a practical upper limit to the gas pressure at which a discharge can be maintained for continuous wave (CW), or quasi CW, longitudinally pumped electrically and RF excited axial or transverse flow $CO_2$ lasers. This is typically in the vicinity of 100 to 200 Torr for the immediately preceding applications, and that with high dilution of the gas mix with Helium in all cases, CW or transverse pulsed applications, lowering the resident active gas component, $CO_2$'s, partial pressure is inevitable.

Gain medium management and cavity design are major considerations in $CO_2$ lasers as the intense electrical discharge excitation pulses are effective at driving molecular dissociation, and thereby reordering the nature of the molecular species present, disrupting the initial engineered gas mix in terms of molecular species and proportion. Specifically, the high voltage pulses required in discharge pumped $CO_2$ systems, and even RF pumped systems, induce a molecular dissociative process in the $CO_2$ gas within the laser gas mixture itself, resulting in the formation of CO and $O_2$, and less favorable molecular isotopologues of $CO_2$, for example, thus compromising the designed utility desired. This occurs in sealed $CO_2$ lasers even at low pressures, albeit homogenous and in-homogenous phase catalysis can sustain operation, but cannot over time preserve the detailed nature of the initial engineered gas mix $CO_2$ molecular isotopologue character in terms of species and proportion, and therefore the desired and initially engineered attributable spectral gain distribution.

By way of example, an initial gas of primarily 628 $CO_2$ ($^{15}O^{12}C^{18}O$) rapidly statistically equilibrates into a mixture of 626:628:828 of relative proportional presence 1:2:1 through a discharge driven molecular dissociation followed by recombination process.

Almost all sealed $CO_2$, typically low pressure, lasers use at least a quaternary mix, or even one with five constituents. $H_2O$ or $H_2$, CO, or Xe are mostly added as homogenous phase catalysis assists, and secondly excitation exchange dynamic modifiers. That way, after a series of burn-ins, bake-outs, refills etc., one ends up with a tube that can have up to 10,000 hours lifetime, but which cannot sustain arbitrary $CO_2$ molecular isotopologue mixes as the catalysis recombination assisted process merely facilitates statistical mixing of the dissociated $CO_2$ species. Additionally, at low $CO_2$ partial pressure, the device volumetric extractions possible are very limited. This is best illustrated by the current state of the art low pressure RF pumped transverse flow and axial flow master oscillator power amplifier assemblies, both of which are substantial and complex systems, utilized in laser driven plasma extreme EUV photolithography.

Other existing approaches that attempt to remedy gas breakdown arising through contamination via discharge associated sputtering products and molecular dissociation and the corresponding gas lifetime reduction consequence include (i) flowing new gas axially into and through the chamber (which demands a corresponding out bleed, discarding used gas), and (ii) recirculating the dissociated gas through a catalyst to recombine the molecules, which albeit with a 626 say $CO_2$ molecular isotopologue is effective in extending gas lifetime, yet immediately eliminates the ability to exploit arbitrary mixes of $CO_2$ molecular isotopologues via the then facilitated molecular dissociation plus recombination enabled statistical mixing process.

Additionally, with regards to gas flow replacement, a flow in and bleed out and discard method is simply not affordably practical due to the need to discard rare isotope molecular isotopologues of $CO_2$. The employment of rare isotope molecular isotopologues is naturally then automatically excluded from consideration. Indeed, if the desire is to exploit said arbitrary mixes, a device offering near indefinite sealed shelf and dynamic lifetime of the engineered gas fill is required, which equally excludes then discharge excitation as a viable device pump.

Most high power pulsed (MWs) $CO_2$ lasers are now constructed using Transverse Excited Atmospheric (TEA) designs. Rather than having a long tube with an electrical discharge along its length and the $CO_2$ gas mixture flowing from end to end, a series of parallel located electrodes are positioned, and the gas is transversely flowed between them. In this manner, increased pressures of operation of up to approximately 10 atmospheres can be employed as the electrical discharge doesn't need to go the full length of the tube—only across it. Therefore, the voltage, although challenging even for modest between electrode spacing is, to a degree, attainable. If the electrode spacing is increased to increase device aperture, the voltage required rapidly enters the impractical realm.

Similarly, if the aperture is retained, but device pressure is increased, the voltage requirement equally scales into the impractical realm. The limiting consequences of this approach are well known and well documented, and are well illustrated by the current state of the art PaR systems HP300/75 high pressure $CO_2$ laser. This is a device of better than a metric ton, utilizing a relatively low partial pressure $CO_2$ gas mix, (high He content), capable of no more than a 300 Hz pulsed repetition rate, of strictly limited gas lifetime, and incapable of exploiting and sustaining an arbitrary mix of $CO_2$ molecular isotopologues and therefore a truly freely engineered spectral gain distribution. It is in fact tied to statistically equilibrated gas mixes, by its discharge excitation, and by its catalyzer requirement.

The wall plug efficiency of these devices is also very low, around 0.2% into acceptable output beam quality, as they are particularly subject to discharge related deexcitation processes, and their volumetric extraction is low as in order to facilitate their function they are typically operated with Helium rich gas mixes, thereby degrading the $CO_2$ partial pressure. Their limited repetition rate capability is a direct consequence of the instability features of a transient electrical discharge. Specifically post discharge and lasing there is typically a thermally driven pressure pulse. The residual acoustic structure reflects off internal aspects of the electrode array and housing of the device, and if not sufficiently degraded, will destabilize the following discharge via the influence of the attributable density variations within the discharge volume. This latter typically manifests as filamentation in the discharge which is associated with non-uniform energy deposition and progression to arc formation. Onset of this behavior degrades beam quality and efficiency, to total failure as it progresses to arc.

Relativistic electron beam (REB) pumped, or REB sustained discharge, excited raised pressure $CO_2$ lasers have been demonstrated as an alternative although allied method, still discharge, but the anode foil is extremely vulnerable both to electron beam power deposition and of course the pressure differential between the raised pressure $CO_2$ lasing volume and the vacuum of the electron beam diode is an engineering challenge. Additionally, once again, very substantial acceleration voltages are required, and such systems although laboratory viable are not commercially practical. Scaling of the pumped volume demands scaling of the electron beam accelerating voltage, and the realm of impracticality is rapidly approached.

To reiterate, the performance/capability ceilings are inherent to the discharge excitation method. It is thereby in general possible to have: Repetition rate, but at miniscule pulsed volumetric extractions in say approximately 100 ns events, hence the locomotive scale of laser produced plasma extreme ultraviolet photolithography drivers; or 'reasonable' volumetric extraction for state-of-the-art high-pressure systems, a two-metric ton 30 W ($TEM_{00}$ beam quality) system, at very low repetition rate.

SUMMARY OF THE INVENTION

Rather than either directly or indirectly pumping the $CO_2$ laser gain medium gas via molecular vibrational excitation through use of intense electrical discharge, the instant invention discloses and teaches coupling of an efficient diode pumped solid state (DPSS) system custom matched to the desired pump band of a given gas to the laser gain cavity coaxial with the lased beam to compactly and efficiently achieve population inversion under a wider range of conditions than readily possible via discharge pumping. Incorporating a highly versatile, stable, efficient and reliable pumping approach such as a DPSS laser, and thus optical pumping rather than discharge pumping, significantly improves the scalability, practicality, performance, reliability, form factor, simple mass and costs, initial and operating, of $CO_2$ lasers.

The solution is to be found by replacing the discharge pump with an optical pump. For an optically pumped molecular laser (OPML) to be successful, the source of the optical pump must be scalable, efficient, reliable, robust, affordable and offer energy storage for pulsed applications when diode laser pumped. The latter is a necessity for reliability, robustness and reduced thermal loading of the source material in this case, thereby enabling repetition rating be it sustained or heat capacity related burst mode capable. Additionally, it's output must be a near ideal and natural spectral match to that of the available $CO_2$ pump bands. Fortunately, all these criteria can be met by a class of available DPSS lasers.

It is preferable to not introduce the pump beam axially through the OPML cavity mirrors, as some temporal overlap of the pump and OPML cavity lasing event may occur, enhancing the resultant fluence on them and thereby rendering them more vulnerable to LIDT limits. Therefore, the forgoing DPSS front end to the OPML demands suitable optics to introduce the pump beam from the DPSS front end into the OPML gas medium, and possibly extract it again to enable a return pass of the pump through the medium with the purpose of maximizing pump energy utilization plus supporting axial uniformity of the pumped OPML gas medium. Multilayer dielectric coatings of appropriate refractive index can be dimensioned of 'quarter wave' thickness for the desired cavity reflected pump wave, naturally then orientated away from normal incidence given the system geometry described, and directly ensuring that the coatings are not optically thin relative to the pump wavelengths of interest in order to achieve high reflectance, yet optically thin, and thus low loss, to the transiting OPML lasing wavelength.

As a consequence, the media that can be perhaps implemented are specifically restricted given the wavelength ranges of interest in this application. Such suitable optics must have a suitable laser induced damage threshold (LIDT), and offer reflection efficiency for the input pump beam in this case, and high optical transmission at the OPML wavelength, which is red shifted relative to the pump wavelength.

There are two functionally critical considerations for a suitable optical device for this application. They are respectively the minimization of losses on transmission of the OPML wavelength(s), and device LIDT. The OPML transmission requirement is primary, with LIDT a close second. Pump reflection efficiency is important but subordinate to the preceding. There are other requirements, inclusive of thermal conductivity, chemical inertness and the structural rigidity and the strength attainable from a physically thin optical element, but they are further down the hierarchical necessity listing. Collectively they constitute an optimal solution if realized in an optical element tailored for the wavelengths of interest. The commonly used optical substrates and thin film coating materials typically leveraged within this MWIR, and certainly LWIR, spectral region present with only modest pulsed LIDT energies per unit area, limited material rigidity and structural strength, poor thermal conductivity and questionable chemical resistance.

The instant invention is thus directed at an apparatus and method for coupling DPSS pumping to an OPML gas medium, including the following characteristics specifically tailored for the specified OPML application and thus described Brewster Thin Film Polarizer (TFP) Device. By employing specific substrate and thin film coating materials not previously combined into an optical element of this type, an optimal optic for pump beam introduction into an OPML is realized, and thereby, enables a practical, and from an engineering perspective, a near optimal system in terms of simplicity, robustness and performance, and thus, the solution to exploitation of the DPSS $CO_2$ OPML under consideration.

It is therefore an objective of the instant invention to provide a method and apparatus for directing excitation energy matched to the pump bands of a desired $CO_2$ gain medium gas mix, into said gas mix appropriately and thereby into the volume of $CO_2$ physically occupied by the $CO_2$ lasing or amplification mode, and thus under conditions required for best and efficient function, which inclusive of minimization of $H_2O$ content in gas mix, plus employment of structural media where wetted by gas mix in the OPML device of high activation energy for dissociative adsorption of $CO_2$, all of which lead to the virtual elimination of $CO_2$ gain medium molecular dissociation thus permitting the utilization and preservation of arbitrary mixes of $CO_2$ molecular isotopologues.

It is also an objective of the instant invention to provide a method and apparatus which is capable of withstanding ultrashort pulsed and sub picosecond events derived from optically pumped $CO_2$ lasers or amplifiers, while minimizing attributable nonlinear induced phase shifts.

It is also an objective of the instant invention to provide a method and apparatus for pumping $CO_2$ lasers that conserves laser beam quality.

It is also an objective of the instant invention to provide a method and apparatus for pumping $CO_2$ lasers that is chemically inert to potential gas components.

It is also an objective of the instant invention to provide a method and apparatus for pumping $CO_2$ lasers that can sustain the anticipated fluences at both pump and $CO_2$ lasing wavelengths and average powers by in-coupling and out-coupling the pump away from cavity resonator mirrors, thereby minimizing laser induced damage of laser system optics.

It is also an objective of the instant invention to provide a method and apparatus for pumping $CO_2$ lasers that facilitates maximization of axial uniformity of the pumped $CO_2$ gain medium specifically along the laser beam path while enabling or facilitating engineering of optimized pump coupling to the OPML gas medium.

It is also an objective of the instant invention to provide a method and apparatus for pumping $CO_2$ lasers that will perform robustly in high pressure, high energy $CO_2$ gain medium cavity designs, absent the necessity of employment of relatively thick pressure containment windows with their concomitant bulk loss conveyance, and simple structural difficulty of incorporation and mass.

It is also an objective of the instant invention to provide a method and apparatus that facilitates exploitation of rare arbitrary mixes of $CO_2$ molecular isotopologues as a gain medium for broader spectral reach, greater tunability, and sub picosecond USP access from $CO_2$ transitions.

It is also an objective of the instant invention to provide a method and apparatus that facilitates greatly enhanced gain cavity gas lifetimes and thus reduced consumables use, improved gain medium volumetric extractions, enhanced system wall-plug efficiency, generally resulting in significantly more compact $CO_2$ laser system footprints and attributably then that of the associated peripherals such as power supply needs and thermal management.

DETAILED DESCRIPTION OF THE INVENTION

Embodiments of the instant invention include new thin-film dielectric stack material combinations incorporating an optical media substrate, collectively configured to combine and extricate differing polarized beams on a coaxial path with minimal losses of the transmitted OPML wavelength, within a high energy and high power lasing environment, at low or above atmosphere raised pressure, and exposure to the possibly chemically corrosive environment of an optically pumped molecular gas laser gain medium.

Figure 1:
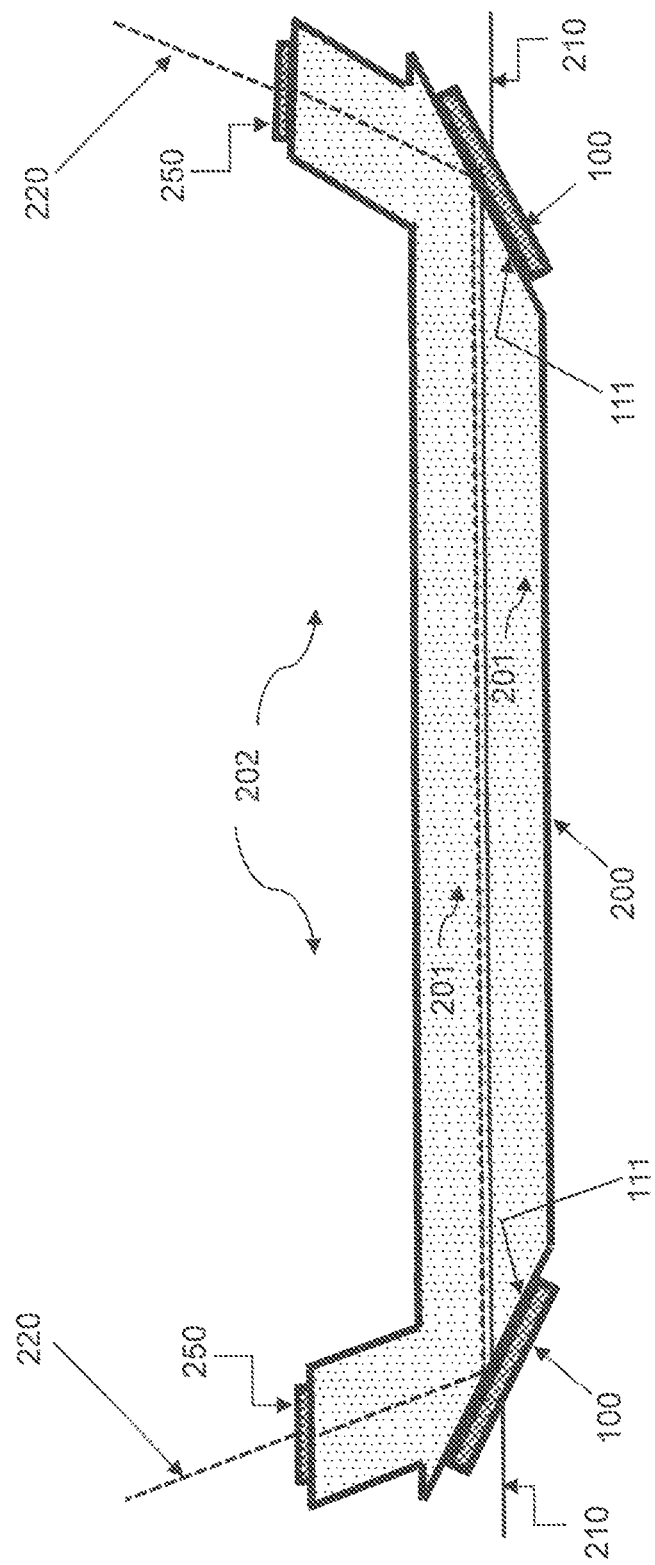
FIG. 1 illustrates an embodiment demonstrating utility of the invention.

Referencing FIG. 1, in the preferred embodiment, the thin film Brewster coupling device (100) is deployed in pairs, with the thin film Brewster coupling devices (100) at opposite ends of the sealed gas tube (200) of a gas laser, and orientated such that the thin film component of the device is preferably interior to the sealed gas tube (200), where the gas tube (200) is positioned between laser cavity mirrors, not shown, typically a 100 percent reflector and a partial reflector for outcoupling. In this deployment, the thin film Brewster coupling device equipped gas tube (200) is utilized in an oscillator arrangement. The thin film Brewster coupling device may also be deployed with the sealed gas tube (200) absent the laser cavity mirrors in an amplifier arrangement. The thin film Brewster coupling device (100) is configured to act as a gas laser tube pressure containment element plus Brewster window, simultaneously facilitating very low-loss in- and out-coupling of a cavity transmitting laser beam (210) transmitting through a gas laser tube (200) containing the gas gain medium (201) while containing the gas tube pressure without deleterious stress and strain induced material related optical distortion deriving from pressure related deformation.

In these arrangements, the thin film Brewster coupling device (100) imposes a polarity in plane of incidence 'p' polarization on the cavity transmitting laser beam. Simultaneously, the thin film Brewster coupling device (100) is configured to in- and out-couple a separate 's' polarized DPSS pump beam (220) of fluence and pump pulse duration selected to drive a useful gain medium population inversion, into the gas gain medium (201) collinear and overlaying the cavity transmitting laser beam (210) via partial reflection in a manner approximately mode matched to the interacting cavity transmitting laser beam (210) in order to achieve optimal partial volume pumping of the gas gain medium (201). The result is no waste pumping in a volume external to that interaction region and the inescapable lost related unutilized pump energy, which ordinarily results in heating and an unavoidable system efficiency drop.

Furthermore, the in- and out-coupling of the 's' polarized pump beam (220) ensures that the laser cavity end-mirrors, and any other optical elements, not shown, are not, or at most minimally, exposed to pump attributable and detrimental secondary energy impacts and resultant damages. The 's' polarization pump is intentionally front surface (111), thus thin film structure incident, reflected off the thin film Brewster device. The pump does not primarily transit the thin film device substrate, although that component of the 's' polarization not reflected may.

In the best mode, thin film Brewster coupling device (100) is configured to facilitate use of an approximately 2 μm or approximately 4 μm 's' polarized DPSS laser source or sources as a gain medium pump wherein the gas gain medium (201) is appropriately designed to emit a 'p' polarized cavity transmitting laser beam (210) in the approximately 8 μm to approximately 11.5 μm range. The primary performance consideration of the thin film Brewster coupling device is the near lossless transit of the 'p' polarized cavity transmitting laser beam (210) through the device.

Losses introduced to the 'p' polarized cavity beam on transmission stem from reflections at the thin film junction surfaces and bulk absorption losses of the TFP device materials. The specialized structure, angular orientation and selected materials are combined to keep these losses to almost negligible levels, while presenting high LIDT, chemical inertness, structural strength and material rigidity from a device of limited thickness. In the case of an oscillator arrangement, given a reasonable system desired design out-coupling in the range of approximately 15% to 30%, and two thin film Brewster coupling devices (100) intracavity per system, a maximum loss of approximately 0.5% percent per device per pass is tolerable given four passes through the thin film Brewster coupling devices (100) per cavity round trip. In the alternate case of an amplifier arrangement, the transmission related absorption losses attributable to the thin film Brewster coupling devices (100) should ideally be no more than approximately 5%. Therefore, a maximum loss of approximately 2.5% percent per thin film Brewster coupling devices (100) in a paired coupling device system, or a single device maximum loss of up to approximately 5% percent would typically be tolerable.

Secondary to near lossless transit of the 'p' polarized-cavity transmitting laser beam (210) through the device is the efficient insertion and extraction of the 's' polarized pump beam (220).

The thin film Brewster coupling device (100) is able to accomplish the identified beam couplings with desired low transmission loss performance through use of a uniquely structured device that exploits the optical effects of Brewster's Law and Fresnel reflectivity coefficients as applied to uniquely distinct pump and OPML wavelengths. While Brewster's Law has been used to efficiently introduce and extract a 'p' polarized cavity transmitting laser beam (210) from a gas laser tube, the thin film Brewster coupling device (100) also takes advantage of the associated increasing optical reflections at high angles of incidence along with the differing transmission and reflectance Fresnel irradiance coefficients between two differing polarized waves incident on the thin film Brewster coupling device (100) in order to co-axially introduce and extract the separate 's' polarized pump beam (220) while minimizing 'p' polarized cavity transmitting laser beam (210) losses.

Furthermore, by incorporating a dielectric stack of specific design choice along with a Brewster window into the thin film Brewster coupling device (100), greater reflectivity of an incident 's' polarized DPSS pump beam (220) is accomplished without materially sacrificing transmitted power of the 'p' polarized cavity transmitting laser beam (210). Innovative material choices and stack configurations significantly enhance the desired effects.

Figure 2:
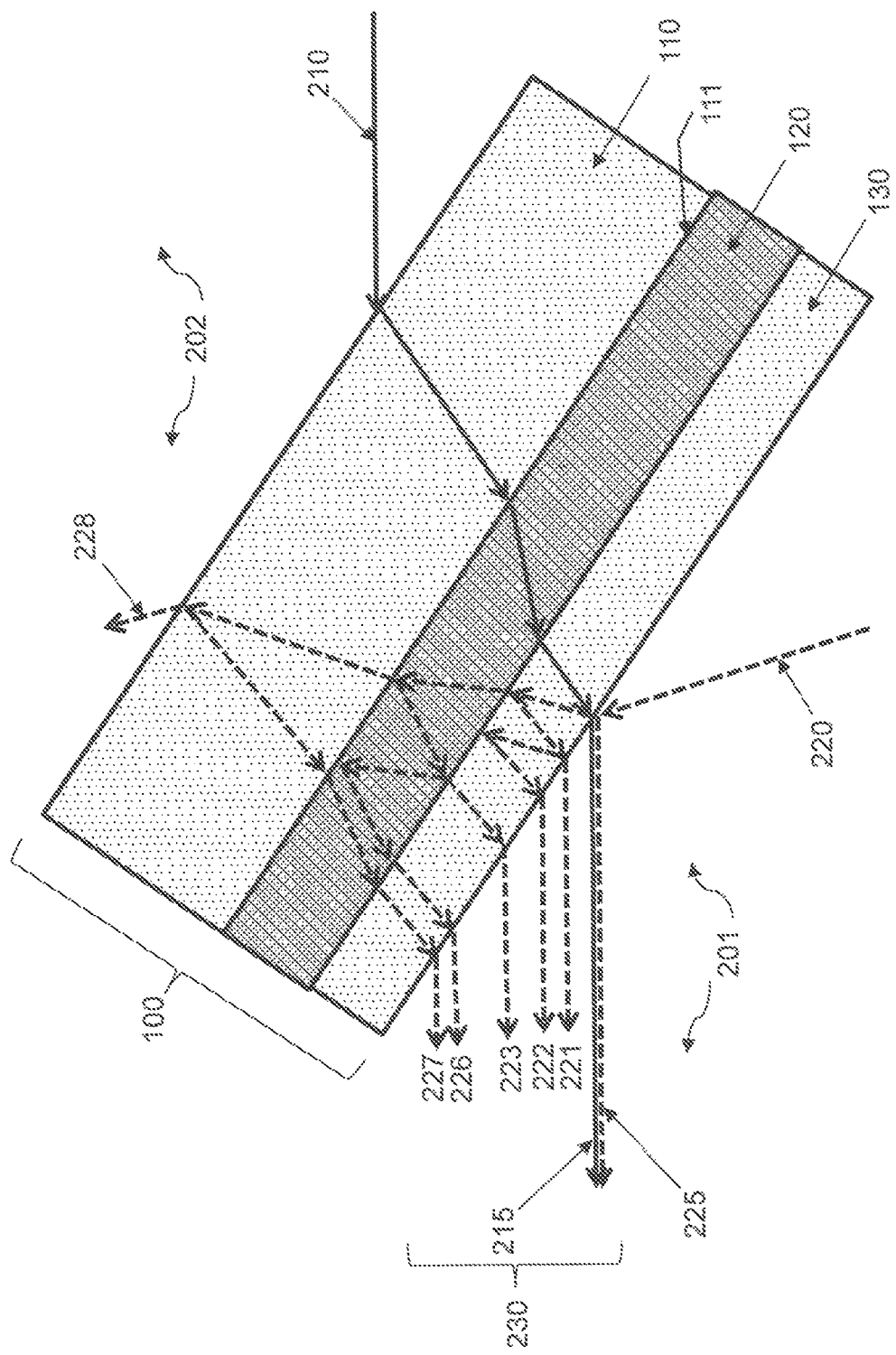
FIG. 2 illustrates the invention's axial pump beam coupling to a gas gain medium.

FIG. 2 demonstrates an embodiment of the thin film Brewster coupling device (100), showing the coaxial combining of a transmitted lasing cavity 'p' polarized cavity transmitting laser beam (210), traversing the thin film Brewster coupling device (100) and emerging as transmitted lasing cavity 'p' polarized cavity transmitting laser beam (215), and the 's' polarized DPSS pump beam (220), reflecting from the thin film Brewster coupling device (100) and emerging into the lasing cavity as an 's' polarized cavity laser beam (225), collinear with the 'p' polarized cavity beam (210). The thin film Brewster coupling device (100) comprises an optical media substrate (110) and a bilayer dielectric stack configuration disposed on the front surface (111) of the optical media substrate (110). The bilayer dielectric stack comprises a dielectric layer (120) and an overlayer (130), all three layers, optical media substrate (110), dielectric layer (120) and overlayer (130), in optical communication.

Through proper material selection and stack designs, inclusive of device orientation, the thin film Brewster coupling device (100) appears as a very low loss Brewster window to the 'p' polarized cavity transmitting laser beam (210) as well as an effective reflector to the incident 's' polarized DPSS pump beam (220). Specifically, the TFP Device requires superior optical characteristics so as to result in an element of very high optical transmission within the approximately 8 µm to 11.5 µm optical band for the 'p' polarized cavity transmitting laser beam (210) as well as an element of as high as viable optical reflection, without jeopardizing 'p' polarization transmission, within the approximately 2 µm or approximately 4 µm optical band for an incident 's' polarized DPSS pump beam (220).

The structure of the thin film Brewster coupling device (100) is such that the optical media substrate (110) contains the longest travel path of the 'p' polarized cavity transmitting laser beam (210) due to its role as the structural component of the thin film Brewster coupling device (100), ensuring containment of the gas gain medium (201) given a potentially large pressure differential between the gas gain medium (201) and the surrounding air (202). As such, the traversing 'p' polarized cavity transmitting laser beam (210) must be incident on the optical media substrate (110) at near the Brewster Angle for an air (202)-to-optical media substrate (110) interface in order to minimize reflective losses of the 'p' polarized cavity transmitting laser beam (210). Therefore, the optical media substrate (110) is the major driver of the angular positioning of the thin film Brewster coupling device (100).

Furthermore, in order to maximize reflectance of the approximately 2 µm or 4 µm incident 's' polarized DPSS pump beam (220). Fresnel reflectance coefficients physical dependence dictate a high angle of incidence as being favorable. Thus, the optical media substrate (110) must exhibit generally ideally as high a refractive index differential across the air (202)-to-optical media substrate (110) interface as possible in order to increase the Brewster Angle of the thin film Brewster coupling device (100). In the case of the instant invention, an index of refraction greater than 2.0 for the optical media substrate (110) achieves simultaneously the elevated Brewster Angle required for low loss transmission of the approximately 8 µm to 11.5 µm 'p' polarized cavity transmitting laser beam (210) as well as high partial reflectance of the approximately 2 µm or 4 µm incident 's' polarized DPSS pump beam (220).

For symmetry and then low loss device throughput, the overlayer (130) should exhibit an index of refraction of ideally near equality to the index of refraction for the optical media substrate (110), and ideally be within plus or minus approximately 0.4 off the substrate's value.

For improved reflection of the approximately 2 µm or 4 µm incident 's' polarized DPSS pump beam (220), the dielectric layer (120) exhibits an index of refraction as low as possible for achieving the highest reflections off of the overlayer (130)-to-dielectric layer (120) and dielectric layer (120)-to-optical media substrate (110) interfaces, but in any case, less than approximately 1.75 for the 2 µm or approximately 4 µm wavelengths. A lower dielectric layer (120) index of refraction, often deriving naturally from the dispersion characteristics of the specifically selected media, also minimizes reflection component associated transmission losses in the approximately 8 µm to 11.5 µm 'p' polarized cavity transmitting laser beam (210) as the device approaches near Brewster function then throughout device for said 'p' polarization. In this configuration, the overlayer and substrate more and more closely mimic a simple airgap Brewster pile of plates stacked at the Brewster angle for the 'p' polarization.

Given the transmission related absorption loss tolerances previously articulated for the oscillator and amplifier deployment arrangements necessitating low loss transmission of the 'p' polarized cavity transmitting laser beam (210), the thin film Brewster coupling device's (100) materials' extinction coefficients must be good to very good within the approximately 8µm to 11.5 µm optical band. These extinction coefficients must equally be acceptable to good within the 2 µm or 4 µm 's' polarized optical band incident on the device. 'Good' to 'very good' is defined to mean low to insignificant.

The thicknesses of the dielectric layer (120) and the overlayer (130) are dimensionally sized to approximately a quarter wavelength of the 's' polarized DPSS pump beam (220) optical path in order to exploit coherent summing of related reflected components. This means the thickness of each layer, either dielectric layer (120) or overlayer (130), is equal to approximately one-fourth of the wavelength of the 's' polarized DPSS pump beam (220) corrected for beam path direction in medium and medium refractive index within the respective layer, including preceding layer reflected component paths deriving from the non-normal angle of incidence. This definition is applied throughout this specification, including the claims, when referencing the dielectric layer (120) and the overlayer (130) thicknesses.

As shown in FIG. 2, the incident 's' polarized DPSS pump beam (220) is partially reflected from the gas gain medium (201)-to-overlayer (130) interface to emerge as a reflected phase-shifted 's' polarized DPSS pump beam (225) within the gain medium (201). The non-reflected portion of the incident 's' polarized DPSS pump beam (220) traverses the gain medium (201)-to-overlayer (130) interface, is refracted and transits through the overlayer (130), where a portion of it reflects off of the overlayer (130)-to-dielectric (120) interface and transmits back through the overlayer (130) and through the overlayer (130)-to-gas gain medium (201) interface, traveling nominally two additional quarter wavelengths and emerges as reflected 's' polarized DPSS pump beam (221). Thus, it's travel is delayed by a half wavelength, which ensures that the emerging reflected 's' polarized DPSS pump beam (221) constructively interferes with the reflected phase-shifted 's' polarized DPSS pump beam (225) within the gain medium (201).

Similarly, another portion of the initially refracted 's' polarized DPSS pump beam (220) that traversed the gain medium (201)-to-overlayer (130) interface and traversed the overlayer (130), traverses the overlayer (130)-to-dielectric (120) interface and the dielectric (120) and is phase-shifted as it reflects off of the dielectric (120)-to-optical media substrate (110) interface. It then traverses back through the dielectric (120), the dielectric (120)-to-overlayer (130) interface, the overlayer (130) and the overlayer (130)-to-gas medium (201) interface and emerges as reflected 's' polarized DPSS pump beam (223). Thus, it's travel is delayed by a full wavelength plus it is phase-shifted as a result of the dielectric (120)-to-optical media substrate (110) reflection, such that the emerging reflected phase-shifted 's' polarized DPSS pump beam (223) also constructively interferes with the phase-shifted 's' polarized DPSS pump beam (225) within the gain medium (201).

Similarly, a third portion of the initially refracted 's' polarized DPSS pump beam (220) that traversed the gain medium (201)-to-overlayer (130) interface and traversed the overlayer (130), traverses the overlayer (130)-to-dielectric (120) interface, the dielectric (120), the dielectric (120)-to-optical media substrate (110) interface, and the optical media substrate (110), and is phase-shifted as it reflects off of the optical media substrate (110)-to-air (202) interface. It then traverses back through the optical media substrate (110), the optical media substrate (110)-to-dielectric (120) interface, dielectric (120), the dielectric (120)-to-overlayer (130) interface, the overlayer (130) and the overlayer (130)-to-gas medium (201) interface to emerge as 's' polarized DPSS pump beam (227). In this case, if the thickness of the optical media substrate (110) is not restricted to multiples of quarter wavelengths of the 's' polarized DPSS pump beam (220) travel path, then it's travel is delayed, and hence phase, is undetermined as it aligns with Vs' polarized DPSS pump beam (225) within the gain medium (201). It would typically constitute a randomly phased contribution to the net reflection, but its contribution is naturally limited by the attenuation experienced in transiting to the optical media substrate (110)-to-Air (202) interface.

Follow-on emerging reflected 's' polarized DPSS pump beam components (222) and (226) are equally in phase with the emerging pump beam components (225), (221) and (223), and further contribute to the net reflectance via coherent summing, collectively traversing the gain medium as 's' polarized pump beam (230). Albeit given the reduced amplitudes of the identified follow-on reflectance components, these components play a diminishing role, yet do constructively interfere with the initial reflections and increase reflectance.

Similarly, there are in principle an infinite number of follow-on emerging reflected components of the 's' polarized DPSS pump beam components which occur after components (222) and (226). The interference contributions of these non-identified components, to the extent permitted by device tolerances and wavelength bandwidths, also constructively interfere with the initial reflections and increase reflected irradiance. However, as infinitesimally small contributions, they are not detailed here, but are included in the emerging beam (230).

By maximizing the 's' polarization reflectance, the pump beam energy imparted to the gain medium (201) by the TFP device is increased, as is net system efficiency, without the need to resort to increasing optical system complexity with a view to, via other means, introducing as much of the pump beam as possible to the gain medium.

In alternate embodiment, a second dielectric stack, or bilayer, comprising a dielectric (120) and an overlayer (130) can be applied directly onto the first stack, thus further enhancing reflected 's' polarized pump beam (220) reflected irradiances. In essence an identically configured and media formed bilayer on the principal bilayer.

Figure 3:
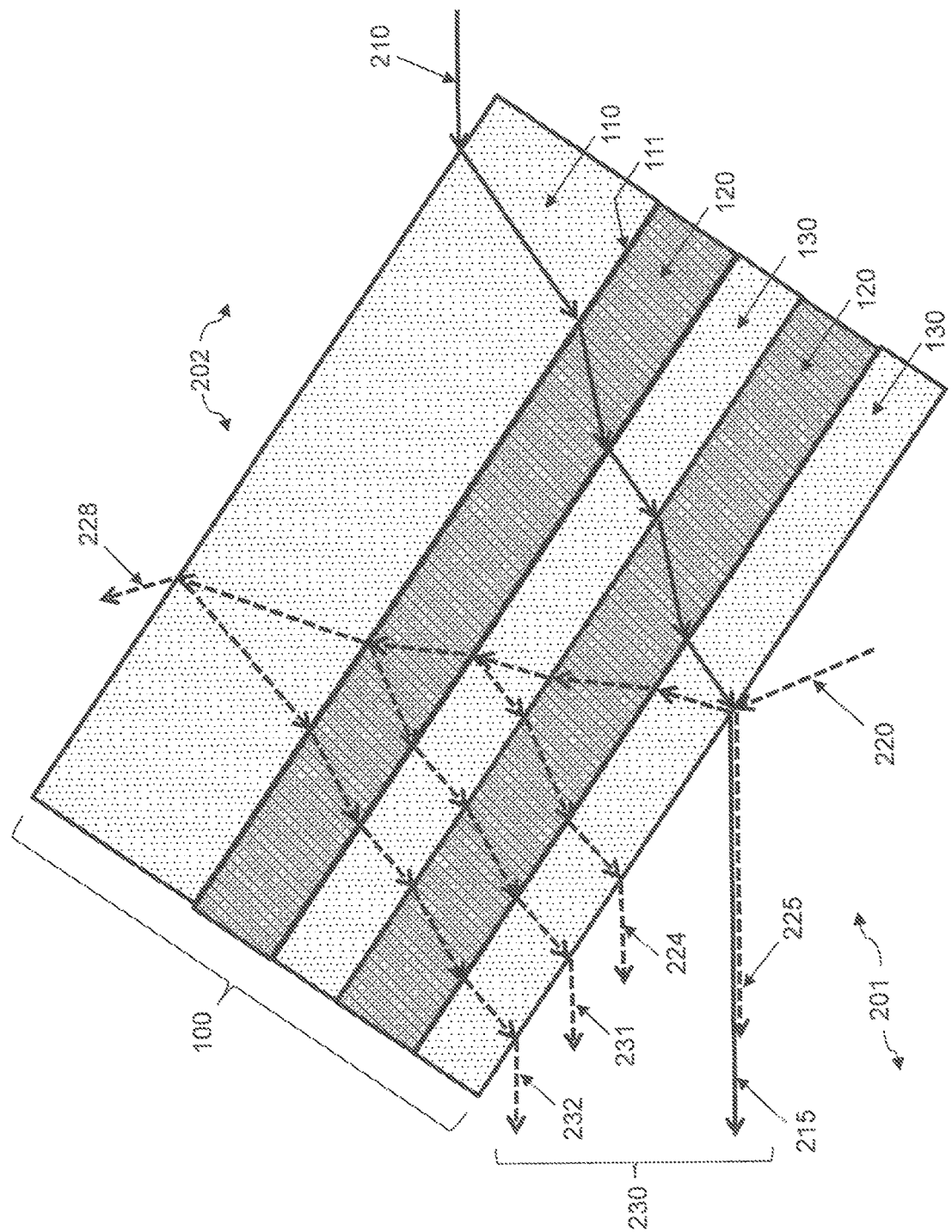
FIG. 3 illustrates an enhanced structure for improved pump beam coupling.

FIG. 3 illustrates two of the additional emerging 's' polarized pump beam components (224) and (231) that result from this embodiment. Emerging 's' polarized pump beam component (224) experiences no reflective phase change at the overlayer (130) to dielectric layer (120) interface, but its optical path is nominally delayed by 6 quarter wavelength travel paths to emerge in phase with, and to constructively interfere with the phase-shifted 's' polarized DPSS pump beam (225) within the gain medium (201).

Emerging 's' polarized DPSS pump beam component (229) experiences a reflective phase change at the dielectric (120)-to-optical media substrate (110) interface and is delayed by 8 quarter wavelength travel paths to emerge in phase with, and to constructively interfere with the phase-shifted 's' polarized DPSS pump beam (225) within the gain medium (201). These additions are minimally further influenced by the randomly polarized reduced emerging 's' polarized DPSS pump beam (232) as a result of the additional layers and further contribute to the net reflectance via coherent summing, again, collectively traversing the gain medium (201) as 's' polarized pump beam (230).

Similar to that described for FIG. 2, there are an infinite number of follow-on emerging reflected components of the 's' polarized DPSS pump beam components which occur after components (224), (231) and (232). The interference contributions of these non-identified components also constructively interfere with the initial reflections and increase reflected irradiance. However, as infinitesimally small contributions, they are not detailed here, but are included in the emerging beam (230).

In alternate embodiments, the dielectric stack configuration comprising a dielectric layer (120) and an overlayer (130) may be repetitively employed. In other words, a one, or two, or three dielectric stack, or bilayer, of specific properties as defined for this application, configuration laid sequentially to form the multilayer stack. The principle governing criteria to be met for efficient function of the OPML concerned will determine what an optimal arrangement would be.

Of course, because of the, in principle, additional bulk absorption and Fresnel losses incurred upon the traversing 'p' polarized cavity transmitting laser beam (210) by the addition of the second or subsequent dielectric stack(s), the 'p' polarized cavity transmitting laser beam (215) emerges slightly more attenuated. There are several features to this for the device of the application. As the dielectric stack layers are optically thin for the 'p' polarization wavelength range of interest, Fresnel reflection components derived from the device are in near ideal antiphase, and destructively interfere very effectively.

Figure 4:
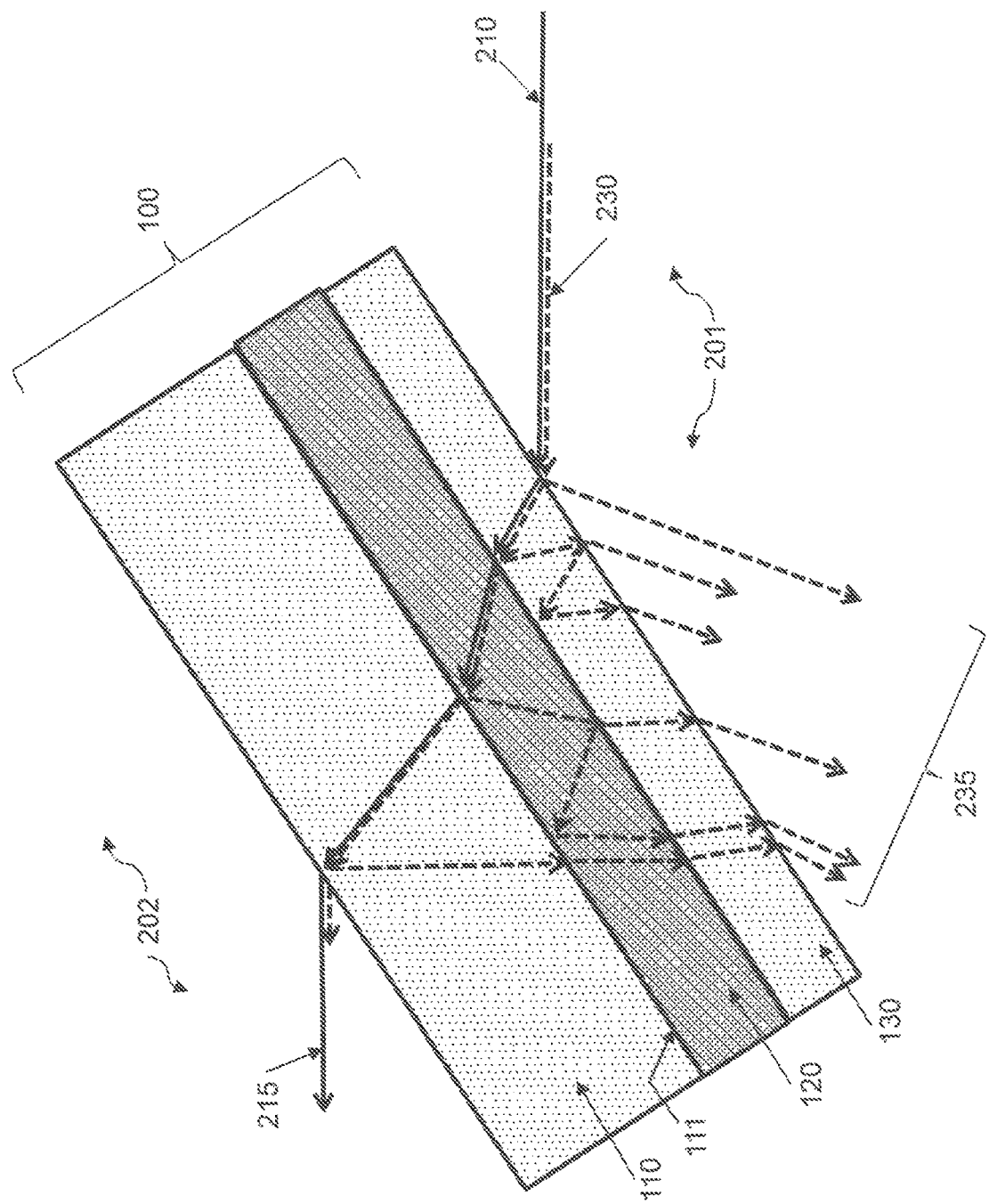
FIG. 4 illustrates a traversing cavity beam path through the device.

Regarding out-coupling of the residual pump beam from the sealed gas tube (200), FIG. 4 illustrates the 's' polarized DPSS pump beam (230), having traversed the gain medium (201) as described from FIG. 2 and FIG. 3, as incident on the thin film Brewster coupling device (100) at the opposite end of the sealed gas tube (200), and the resulting paths which result in the decoupled beam (235) exiting from the sealed gas tube (200). The paths are the same as described for the incidence of the 's' polarized DPSS pump beam (220) in FIGS. 2 and 3, except that the 's' polarized DPSS pump beam (230) now exhibits the attributable pump beam irradiance post it's first transit of the gain medium (201). This may be approximately 37% of initial pump irradiance if the gas gain, and thus pump length, is approximately the absorption scale length.

Use of the thin film Brewster coupling device (100) to couple and de-couple the 's' polarized DPSS pump beam (220) and (230), respectively, from the gas gain medium (201) prevents excessive temporal overlap of the pump and OPML cavity lasing event on the laser cavity end mirrors and minimizes the resultant fluence on them. Thus, system optical elements external to the sealed gas tube (200) are not, or at most minimally, exposed to detrimental secondary energy impacts and resultant damages.

Introduction of the 's' polarized DPSS pump beam (220) can be accomplished by injection into one side of the sealed gas tube (200) through a window (250), then, optionally, reflecting back the residual beam (235) exiting from a second window (250) at the opposite side of the sealed gas tube (200), thereby achieving a near uniform axial pumping. Alternatively, for similar axial uniformity, albeit for a greater useful pump length, the 's' polarized DPSS pump beam (220) may be injected simultaneously from each end, for a gain length of twice the absorption scale length. In either case, residual harvesting of the exiting beams (235) can be accomplished by an external mirror arrangement or optical loop of mirrors of various options and geometries that are well known in the art. This, in conjunction with engineering the length of the gain medium (201) to achieve efficient pump to medium coupling can reduce pump loss and enhance system efficiency to achieve an approximately 90 percent pump utilization.

Reintroduction of exiting 's' polarized DPSS pump beam (235) does come at some relatively minor cost in system complexity. However, pump beam reflection efficiency is subordinate to low loss transmission of the 'p' polarization beam and indeed thin film Brewster device LIDT. The best 's' polarization reflection performance that can be engineered in, without jeopardizing transmission of the 'p' polarization OPML output, while retaining desired LIDT, is the objective within the hierarchy of device conditions.

Figure 5:
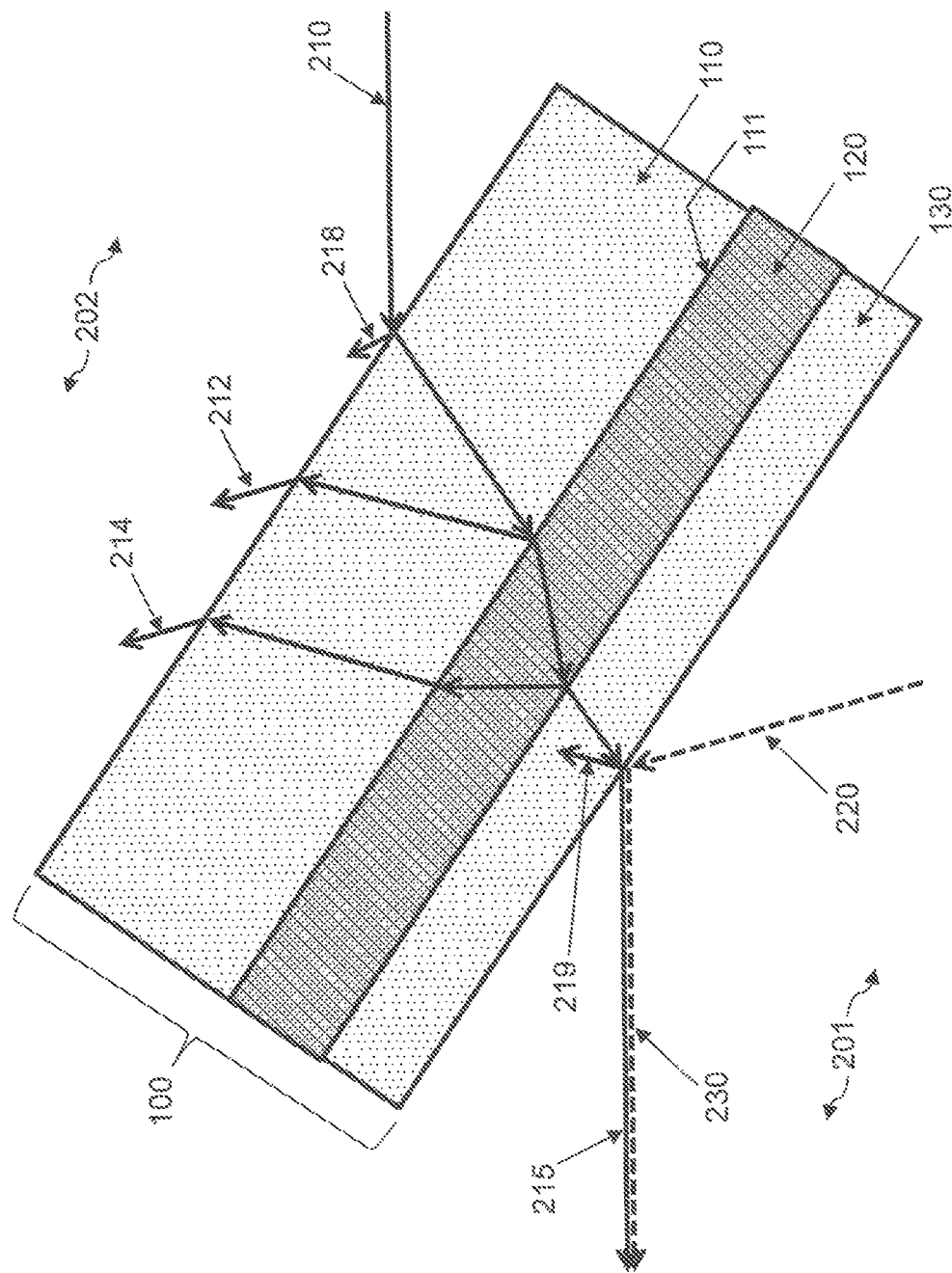
FIG. 5 illustrates decoupling of pump beam from gas gain medium.

Regarding the cavity beam, FIG. 5 illustrates the transmittance of the approximately 8 µm to approximately 11.5 µm 'p' polarized cavity transmitting laser beam (210) through the thin film Brewster coupling device (100) to emerge as 'p' polarized cavity transmitting laser beam (215). When the thin film Brewster coupling device (100) is positioned at or near the Brewster Angle for the air (202)-to-optical media substrate (110) interface, transmission through the air (202)-to-optical media substrate (110) interface and the overlayer (130)-to-gas medium (201) interface are lossless or very near lossless as the indices of refraction are, at least, very near the same for the optical media substrate (110) and the overlayer (130). Therefore, reflections (218) and (219) are zero to negligible for small deviations in the angular positioning of the thin film Brewster coupling device's (100).

Reflected 'p' polarized cavity transmitting laser beam (212) is created as the 'p' polarized cavity transmitting laser beam (210) transits the optical media substrate (110) and impacts the optical media substrate (110)-to-dielectric (120) interface where a portion of it reflects back, transits back through the optical media substrate (110), through the optical media substrate (110)-to-air (202) interface and emerges as a randomly phased reflection relative to the reflected 'p' polarized beam (218), but phased relative to reflected 'p' polarized beam (214) and the ultimate product of reflected 'p' polarized beam (219). Although the thin film Brewster coupling device (100) is not positioned exactly at the Brewster Angle for the optical media substrate (110)-to-dielectric (120) interface, it is typically within a tolerable range of the Brewster Angle for the dielectric material candidates of the TFP Brewster device of this application. This translates into very little reflection at the optical media substrate (110)-to-dielectric (120) interface, and thus, the amplitude of the reflected 'p' polarized cavity transmitting laser beam component (212) is extremely small. Reflected 'p' polarized cavity transmitting laser beam component (212) experiences no phase change at the optical media substrate (110)-to-dielectric layer (120) high to low refractive index interface.

Reflected 'p' polarized cavity transmitting laser beam (214) results as the second portion transits through the optical media substrate (110)-to-dielectric (120) interface, through the dielectric (120) and reflects back off of the dielectric (120)-to-overlayer (130) interface, transits back through the dielectric (120), through the dielectric (120)-to-optical media substrate (110) interface, back through the optical media substrate (110), through the optical media substrate (110)-to-air (202) interface and emerges as a phase-changed reflection. Again, because the thin film Brewster coupling device (100) is within a tolerable angular range of the related Brewster Angle for the dielectric (120)-to-overlayer (130) interface, there is very little reflection at the dielectric (120)-to-overlayer (130) interface, and thus, the amplitude of the reflected 'p' polarized cavity transmitting laser beam component (214) is also extremely small. Reflected 'p' polarized cavity transmitting laser beam component (214) has experienced a half wave phase change upon reflection at the dielectric (120)-to-overlayer (130) interface.

Furthermore, in view of the thickness of the dielectric layer (120) being the thicknesses of a quarter wavelength of the 's' polarized DPSS pump beam (220) optical path, it is only approximately one twenty fourth to one sixteenth of the wavelength of the 'p' polarized cavity transmitting laser beam (210), making the dielectric layer (120) optically thin to the incident approximately 8 µm to approximately 11.5 µm 'p' polarized OPML transmitted wavelength. Thus, not only are the two reflected 'p' polarized cavity transmitting laser beams (212) and (214) extremely small, they are consequently substantially in anti-phase with respect to each other as the only relevant phase change derives from the dielectric layer (120)-to-overlayer (130) interface interaction. There is very limited contributory optical path length influence. Coherently summing these two components leads to an ignorably small reflection of the incident 'p' polarized cavity transmitting laser beam (210) from the thin film Brewster coupling device (100).

In summary, the angular orientation of the thin film Brewster coupling device (100) at the air (202), or gas gain medium (201)-to-optical media substrate (110) interface facilitates low insertion loss of the 'p' polarized cavity transmitting laser beam (210). Provided the refractive index of the overlayer (130) is an acceptable match to that of the optical media substrate (110), the losses incurred at these interfaces, to gas and air, by reflection will be very limited. A property of the Brewster angle assisted by the fact that the reflections will be mutually randomly phased. Also, as the coating layers are optically thin for the 'p' polarization beam within this device configuration, the additionally incurred bulk transit loss will be insignificant provided the media are appropriately selected. Finally, aside from substrate and coating specifics, the orientation of the thin film Brewster coupling device (100) at a high Brewster angle exploits the effective areal increase presented to the incident beams to decrease energy fluence and its related detrimental effects to the device's surface interfaces and layers. Thus, the thin film Brewster coupling device's (100) performance remains robust within the performance targets previously described.

Optimizing the performance of the thin film Brewster coupling device (100), with the constraint of meeting the unique OPML requirements of this application, as previously itemized, is achieved by careful selection of the materials used for the optical media substrate (110), dielectric layer (120) and overlayer (130). While thin film technology art is extensive, it is virtually all directed towards filtering and anti-reflective applications in the visual to NIR spectral range, resulting in what amounts to legacy media and approaches being applied in the MIR and LWIR.

In the instant invention, there exist a number of constraints not collectively encountered in the demonstrated thin film related art. For example, the environment in the optically pumped gas laser of this application operating at partial vacuum or multiple atmospheres at high powers, pulsed and continuous wave (CW), may require corrosion chemical inertness given the gas options, and evidently high-pressure containment and then optical rigidity, and high energy (certainly LIDT) stress performance where other more benign environments require mainly optical performance characteristics. In the instant invention, chemical inertness for the identified elements is defined as corrosion resistance, where corrosion may occur, but only at a sufficiently slow rate that ensures no impediment to the device performance within its practical lifetime, thus element corrosion arising from any chemical reactions would not be the limiting factor in the useful lifetime of the device application. Furthermore, structural combination designs for the uniquely selected materials requires careful consideration, as amongst other factors, adhesion is not assured.

As a whole, the thin film Brewster coupling device (100), including the optical media substrate (110) and specific thin film stack, dielectric layer (120) and overlayer (130), must critically exhibit uniformly low loss to the traversing approximately 8 µm to 11.5 µm 'p' polarized cavity transmitting laser beam (210) and effective reflection of the approximately 2 µm to 4 µm 's' polarized DPSS pump beam (220), structural strength for gas gain medium (201) pressure containment, high laser induced damage threshold (LIDT), inertness to gas gain medium (201) interaction and sufficient heat transfer capability to offset any inefficiencies. It must also present as a material for which the activation energy of dissociative surface adsorption is high.

Required optical properties of the optical media substrate (110) include a high index of refraction, 2.0 or greater across the wavelengths of interest, 2 µm to 11.5 µm, in order to achieve a high Brewster Angle design, a very low bulk extinction coefficient for the wavelengths of interest, ideally near 0 from approximately 8µm to approximately 11.5 µm to keep bulk absorption losses at negligible levels, and a significant band gap energy to hinder electron avalanche formation. The latter typically associated with a high laser induced damage threshold across the wavelengths of interest.

Mechanically, the optical media substrate (110) must possess high thermal conductivity, approximately 1,000 W/m-K or better, both to dissipate absorption losses, and thus thermal deposition, within the substrate, as well as to quickly wick away excess heat generated within adjacent dielectric layers. When implemented as an integral element of a pressure cell, it must exhibit limited pressure deformation and high structural rigidity, as represented by the modulus of rupture, or Youngs Modulus of approximately 1,000 GPa or better in order to be capable of containing the gas gain medium (201) within the tube without material deformation for relatively thin sectional material. The optical media substrate (110) must also be chemically inert to the gases potentially in the gas gain medium (201) of the OMPL under consideration. These gases may include $CO_2$. HBr+ $CO_2$ and HBr.

Regarding the optical media substrate (110) materials, conventionally selected materials for Brewster windows suitable for the spectral range of interest are KCl, NaCl, ZnSe, ZnS, and perhaps Si which lead to Brewster Angles of approximately 55.6 degrees to approximately 73 degrees respectively for the wavelengths of interest. However, disadvantages of KCl, NaCl, ZnSe, ZnS and Si are their limited LIDT capability which is a broad disqualifier, and in the case of Si, unfavorable extinction coefficient in the OPML wavelength range for the window thicknesses required, generally low thermal conductivity, generally poor material rigidity and modulus of rupture or equivalently, tensile strength, thus requiring greater optical media substrate (110) thicknesses, with concomitant difficulty of integration with gas pressure cell. This results in enhanced internal optical path length, and thus, increased potential for undesirable levels of non-linear self-focusing and or induced phase aberration, enhanced pressure induced deformation and related beam aberration.

In the best mode of the instant invention, the optical media substrate (110) comprises diamond, either polycrystalline or single crystal produced via any suitable means of manufacture, including, but not limited to CVD or PECVD. Diamond exhibits a high index of refraction of approximately 2.38 from 2 µm to 11.5 µm, a very high Youngs Modulus, of approximately 1,050 GPa., and a very low extinction coefficient, near zero from approximately 8 µm to approximately 11.5 µm, albeit some multi-phonon assisted absorption from approximately 2.5 µm to approximately 5.5 µm. This absorption band behavior is mitigated by the highly reflective nature of the diamond/dielectric/diamond bilayer stack structure, which effectively eliminates the 2 µm to 4 µm 's' polarized DPSS pump beam (220) from transiting the substrate. Diamond also exhibits a very high thermal conductivity of approximately 1,000 W/m-K or greater, central to wicking away excess heat from abutting dielectric layer(s) (120), and a significant band gap energy hindering electron avalanche formation and derivatively typically high LIDT. Diamond also has established chemical corrosion resistance and thus inertness for most gas laser applications.

Figure 6:
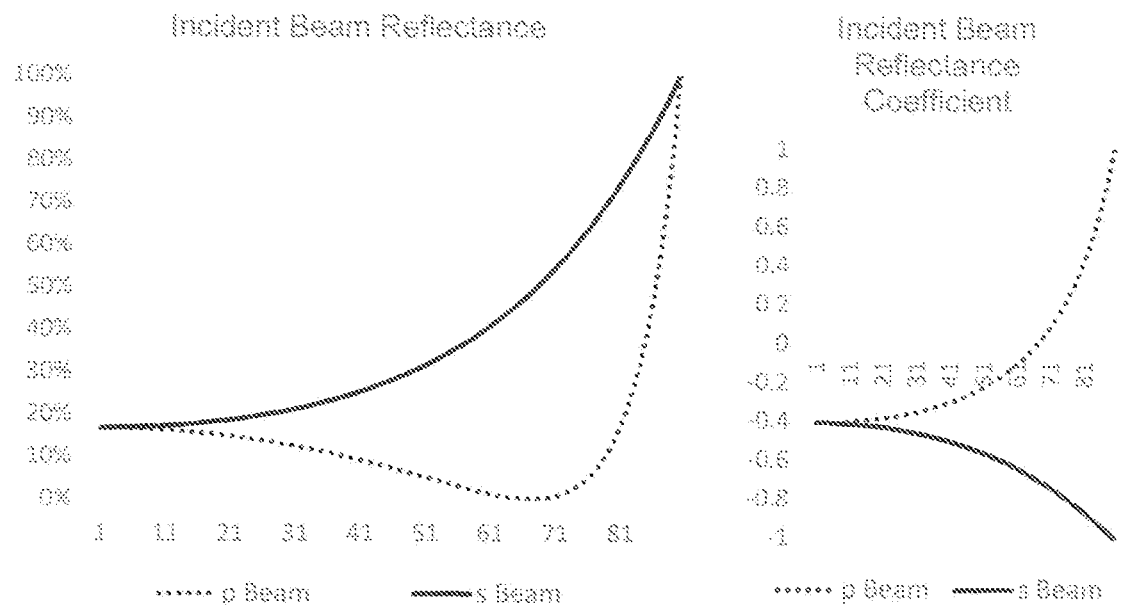
FIG. 6 illustrates Fresnel reflectance coefficients and amplitudes for an air to diamond interface. The Fresnel coefficients are related to an associated representational incident and reflected field direction convention. Commonly applicable to all cases in this specification.
Figure 7:
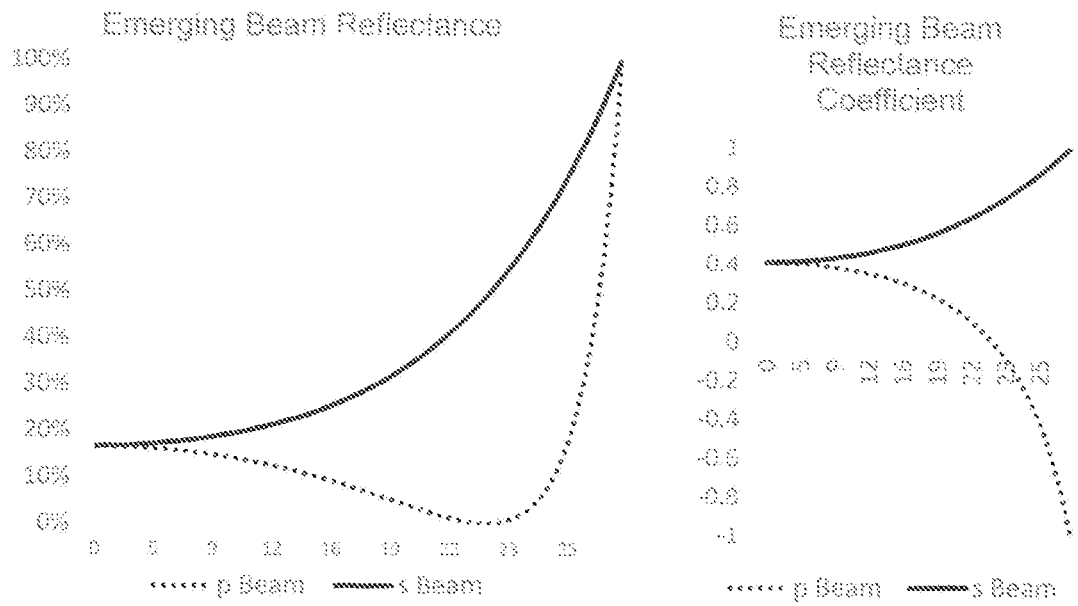
FIG. 7 illustrates Fresnel coefficients and amplitudes for a diamond-to-air interface.

FIG. 6 and FIG. 7 graphically demonstrate the Fresnel transmissive and reflective coefficients and intensities for an air (202)-to-diamond optical media substrate (110) interface and the diamond optical media substrate (110)-to-air (202) interface. For a 'p' polarized beam, diamond's high index of refraction puts the Brewster Angle at approximately 67.2 degrees, thus providing for the high angle of incidence desired for the dielectric stack overlayer (130), and to reflect approximately half of the incident 's' polarized DPSS pump beam (220) at its initial reflection. Furthermore, diamond's relatively high reflective curve for an 's' polarized beam at angular deviations around the selected Brewster Angle provide for a fairly broad window of allowable angular positioning of the thin film Brewster coupling device (100) in order to maximize reflectance of the initial and follow-on 's' polarized DPSS pump beam (220) and (230) reflections.

The overlayer (130), serves as the thin film Brewster coupling device's (100) primary reflective mechanism for the 's' polarized DPSS pump beam (220), while simultaneously presenting a low loss path to the 'p' polarized cavity transmitting laser beam (210). Courtesy of specific device configuration and material choices, overlayer (130) and optical media substrate (110)-to-air (202) interfaces are at or near Brewster angle for the 'p' polarization, resulting in insignificant reflection losses, and reflection losses derived off device overlayer (130)-to-dielectric layer (120) and dielectric layer (120)-to-substrate (110) interfaces are near ideally mutually antiphase and destructively interfere given the optical thinness of coating layers to the 'p' polarized cavity transmitting laser beam (210) and characteristics of interface reflection.

The selected overlayer (130) material should exhibit a high index of retraction equal or very similar to that of the optical media substrate (110), and be no more than plus or minus approximately 0.4 off the substrate value. Neither the optical media substrate (110) nor the overlayer (130) refractive indices should be smaller than 2. Other relevant optical properties include a very low extinction coefficient for the wavelengths of interest, near 0 from approximately 8 μm to approximately 11.5 μm to keep bulk absorption losses to negligible levels, a weak possible phonon coupled band from approximately 2.5 μm to in excess of approximately 5.5 μm may exist but is irrelevant to the 'p' polarization concerned, and to the 's' polarization it presents physically of very limited spatial extent, plus a significant material band gap energy across the wavelengths of interest, namely approximately 2 μm to 11.5 μm, which is a trend indicator of useful LIDT capability.

Mechanically, the overlayer (130) must possess high thermal conductivity, at least 500 W/m-K or greater, both to facilitate dissipation of heating deriving from absorption losses within the overlayer (130), as well as to quickly wick away excess heat generated from adjacent dielectric layers, high material rigidity, at least 500 GPa. and a high fracture strength of approximately 350 MPa or better. The overlayer (130) must also be chemically inert to the gases in the gas gain medium (201).

In the best mode, the overlayer (130) comprises a diamond-like coating, or as an acronym, a DLC, as it can be engineered to exhibit properties very similar to diamond, which meet or exceed the requirements in all areas. DLC may exhibit a high index of refraction of approximately 2 to 2.38 from 2 μm to 11.5 μm, a high Youngs Modulus, approximately 500 GPa or better, a very low extinction coefficient, near zero from approximately 8 μm to approximately 11.5 μm, and a high thermal conductivity of approximately 500 W/m-K or better, which is necessary to wick away excess heat from the dielectric layer (120). DLC also exhibits a significant band energy gap, and thus as is typical a high LIDT threshold. It presents then with a low or adequate absorption at the wavelengths of interest, high thermal conductivity, and chemical inertness for gas laser applications. At the operating temperatures of an OPML laser, DLC is highly chemically inert to the gases $CO_2$, $HBr+CO_2$ and $HBr$.

Given DLC's similar atomic structure to CVD or single crystal diamond, FIG. 6 and FIG. 7 also graphically demonstrate the Fresnel transmissive and reflective coefficients and intensities for a gas gain medium (201)-to-DLC interface and the DLC-to-gas gain medium (201) interface. DLC's high index of refraction helps maintain the Brewster Angle at approximately that of the diamond optical media substrate (110), thus providing for the high angle of incidence desired for the overlayer (130) to reflect approximately half of the incident 's' polarized DPSS pump beam (220) at its initial incidence. Fortunately, for both the optical media substrate (110) and overlayer (130) materials selected, the refractive index can be engineered to some degree in the CVD or PECVD or any other suitable available growth process. Furthermore, DLC's low 'p' polarized reflective coefficients at angular deviations around the Brewster Angle provide for a fairly broad window of allowable angular positioning of the thin film Brewster coupling device (100) in order to maximize transmission of the 'p' polarized cavity transmitting laser beam (210).

The dielectric (120) serves as the thin film Brewster coupling device's (100) secondary recovery mechanism for the further reflection of components off the residual transmitted 's' polarized DPSS pump beam (220), thereby enhancing the net reflection of the 's' pump beam. The dielectric (120) also must simultaneously present a low loss path to the 'p' polarized cavity transmitting laser beam (210). While high thermal conductivity of the dielectric (120) is desirable, it is not crucial. The physical thinness of the layer and proximity to the optical media substrate (110) and DLC overlayer (130), both of high thermal conductivity assist rapid thermal relaxation or dissipation of any residual heat, ideally providing further LIDT mitigation.

Structured between the optical media substrate (110) and the overlayer (130), the required properties of the dielectric layer (120) include an extinction coefficient k smaller than approximately 0.01 at 2 μm to 11.5 μm to minimize heat generation and keep bulk absorption losses to acceptable levels, and an index of refraction between that of the surrounding gas and that of the substrate and less than approximately 1.7 over the approximately 2 μm to 11.5 μm spectral range.

In the preferred embodiment, a dielectric layer (120) exhibits a decaying index of refraction as the wavelength increases, or normal dispersion, for the dielectric material of interest to further enhance the optical "thin-ness" for the 8 μm to 11.5 μm wavelength.

Figure 8:
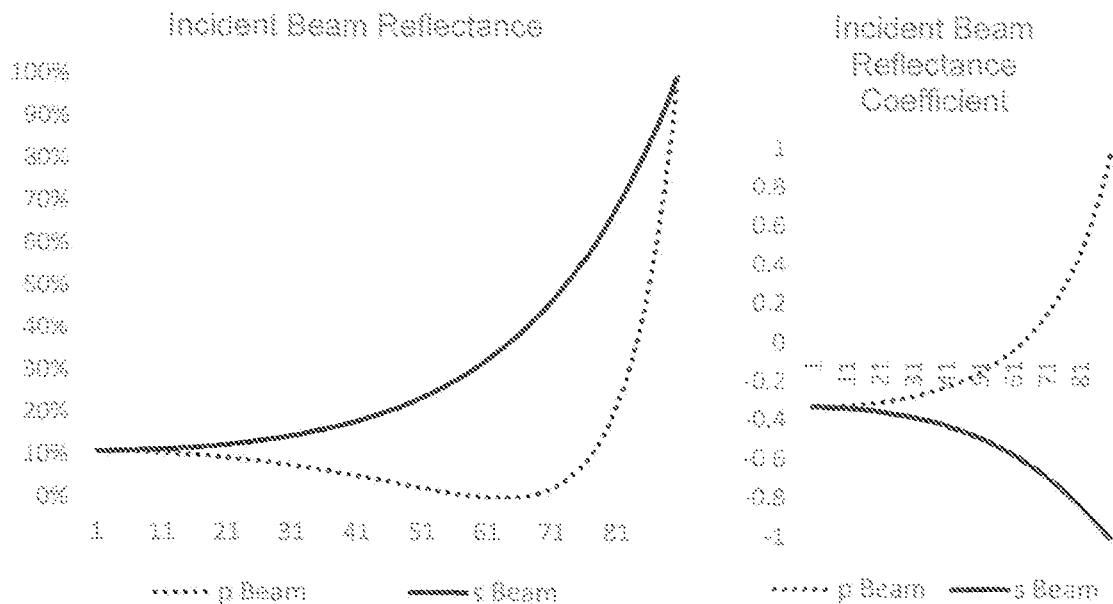
FIG. 8 illustrates Fresnel coefficients and amplitudes for a MgO-to-diamond interface.
Figure 9:
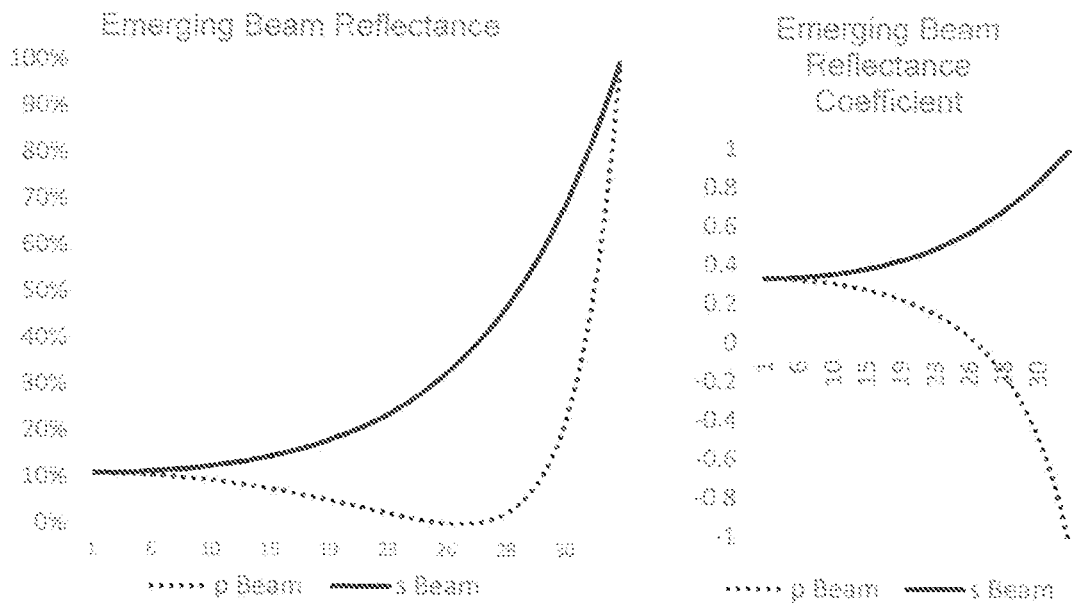
FIG. 9 illustrates Fresnel coefficients and amplitudes for a diamond-to-MgO interface.

In one embodiment, the dielectric layer (120) is comprised of MgO. FIG. 8 and FIG. 9 graphically demonstrate the Fresnel transmissive and reflective coefficients and intensities for a diamond optical media substrate (110)-to-MgO dielectric (120) interface and the MgO dielectric (120)-to-diamond optical media substrate (110) interface where MgO exhibits an index of refraction of approximately 1.25 for an 11 μm beam.

For a 'p' polarized beam, the MgO Brewster Angle, when sandwiched between the optical media substrate (110) and overlayer (130), is approximately 26.7 degrees at the diamond optical media substrate (110)-to-MgO dielectric (120) interface, and approximately 63.3 degrees at the MgO dielectric (120)-to-DLC Overlayer (130) interface. These angles are less than approximately 4 degrees away from the Brewster Angles for the diamond optical media substrate (110)-to-Air (202) and DLC overlayer (130)-to-gas gain medium (201) interfaces, thus providing for low loss transit of the 'p' polarized cavity transmitting laser beam (210) through the dielectric (120) when the thin film Brewster coupling device (100) is positioned at or near the Brewster Angle for the Optical media substrate (110)-to-Air (202) and closely matching Overlayer (130)-to-gas gain medium (201) interfaces.

The deviations from the Brewster Angles do lead to small reflections of the 'p' polarized cavity transmitting laser beam (210). However, as previously noted, not only are the two reflected components off the 'p' polarized cavity transmitting laser beams, (212) and (214) extremely small, they are mutually coherent and substantially anti-phase with respect to each other, leading to an ignorably small net reflection, and thus minimal attributable loss, of the incident 'p' polarized cavity transmitting laser beam (210) from the thin film Brewster coupling device (100).

Figure 10:
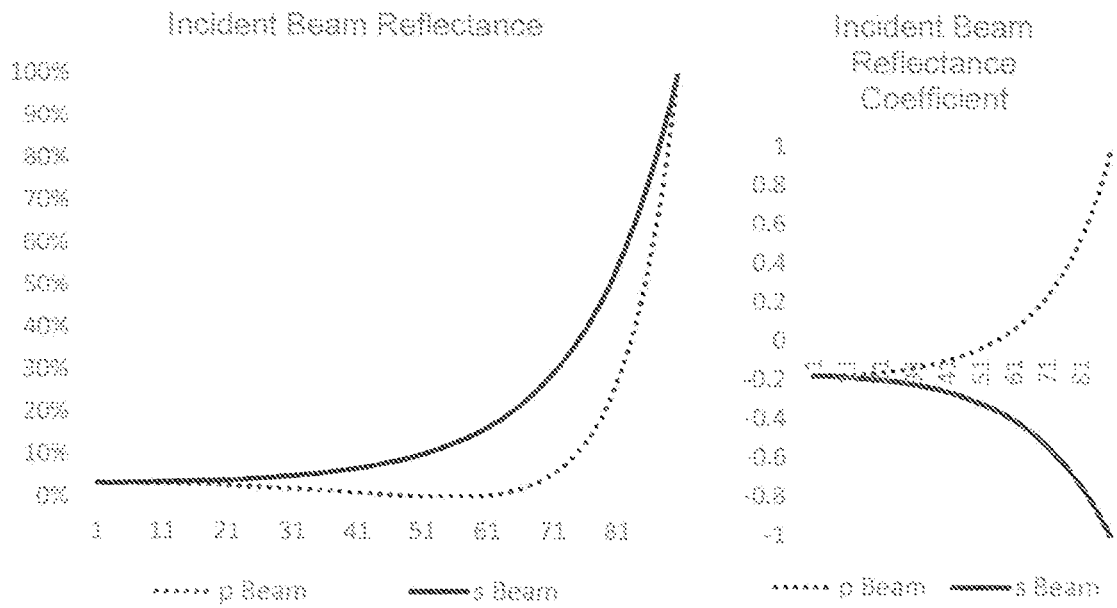
FIG. 10 illustrates Fresnel coefficients and amplitudes for a $PbF_2$-to-diamond interface.
Figure 11:
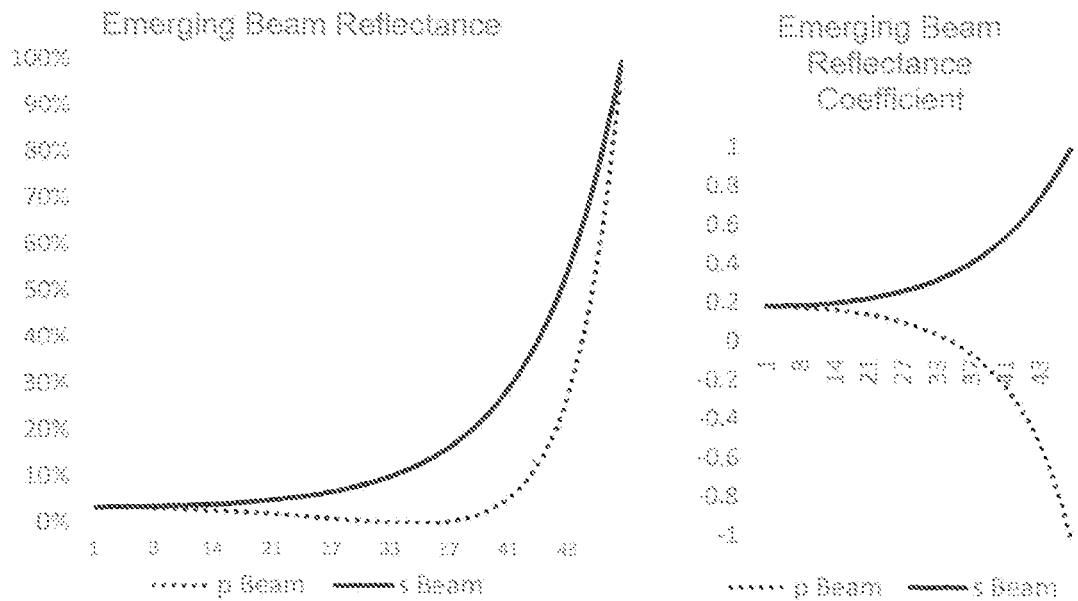
FIG. 11 illustrates Fresnel coefficients and amplitudes for a diamond-to-$PbF_2$ interface.

In an alternate embodiment, the dielectric layer (120) is comprised of $PbF_2$. FIG. 10 and FIG. 11 graphically demonstrate the Fresnel transmissive and reflective coefficients and intensities for a diamond optical media substrate (110)-to-$PbF_2$ dielectric (120) interface and the $PbF_2$ dielectric (120)-to-diamond optical media substrate (110) interface where $PbF_2$ exhibits an index of refraction of approximately 1.65 for an approximately 10 μm beam.

For a 'p' polarized beam, the $PbF_2$ Brewster Angle, when sandwiched between the optical media substrate (110) and overlayer (130), is approximately 34.7 degrees at the diamond optical media substrate (110)-to-$PbF_2$ dielectric (120) interface, and approximately 55.3 degrees at the $PbF_2$ dielectric (120)-to-DLC Overlayer (130) interface. These angles are less than approximately 12 degrees away from the Brewster Angles for the diamond optical media substrate (110)-to-Air (202) and DLC overlayer (130)-to-gas gain medium (201) interfaces, thus providing for low loss traversal of the 'p' polarized cavity transmitting laser beam (210) through the dielectric (120) when the thin film Brewster coupling device (100) is positioned at or near the Brewster Angle for the Optical media substrate (110)-to-Air (202) and closely matching Overlayer (130)-to-gas gain medium (201) interfaces.

The deviations from the Brewster Angles do lead to small reflections of the 'p' polarized cavity transmitting laser beam (210). However, as previously noted, not only are the two reflected components off the 'p' polarized cavity transmitting laser beams (212) and (214) extremely small, they are mutually coherent and substantially anti-phase with respect to each other, leading to an ignorably small net reflection, and thus minimal attributable loss, of the incident 'p' polarized cavity transmitting laser beam (210) from the thin film Brewster coupling device (100).

Figure 12:
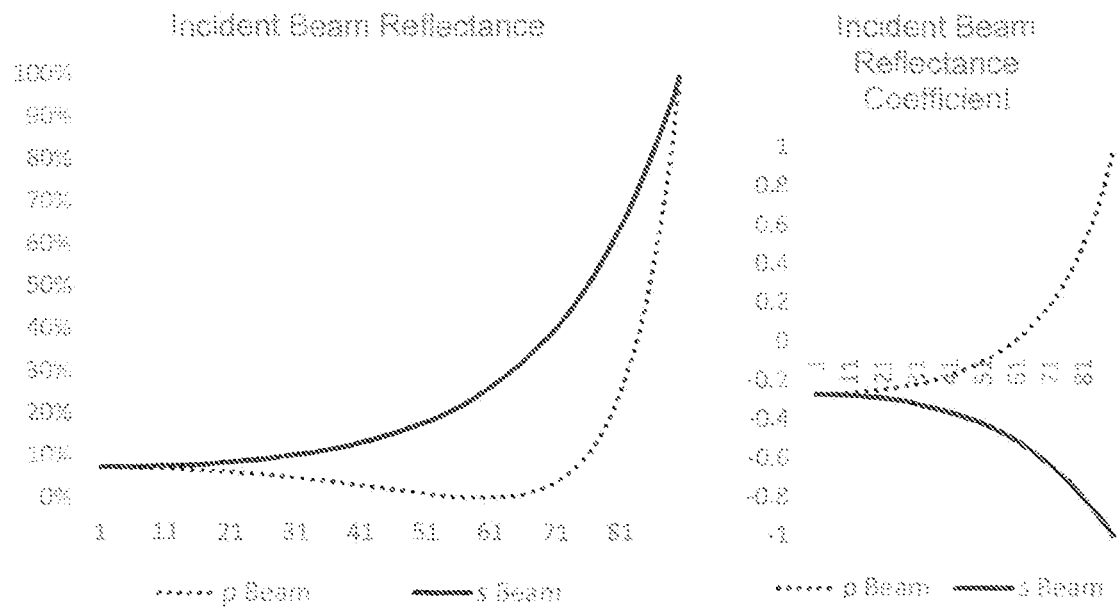
FIG. 12 illustrates Fresnel coefficients and amplitudes for a $SrF_2$-to-diamond interface.
Figure 13:
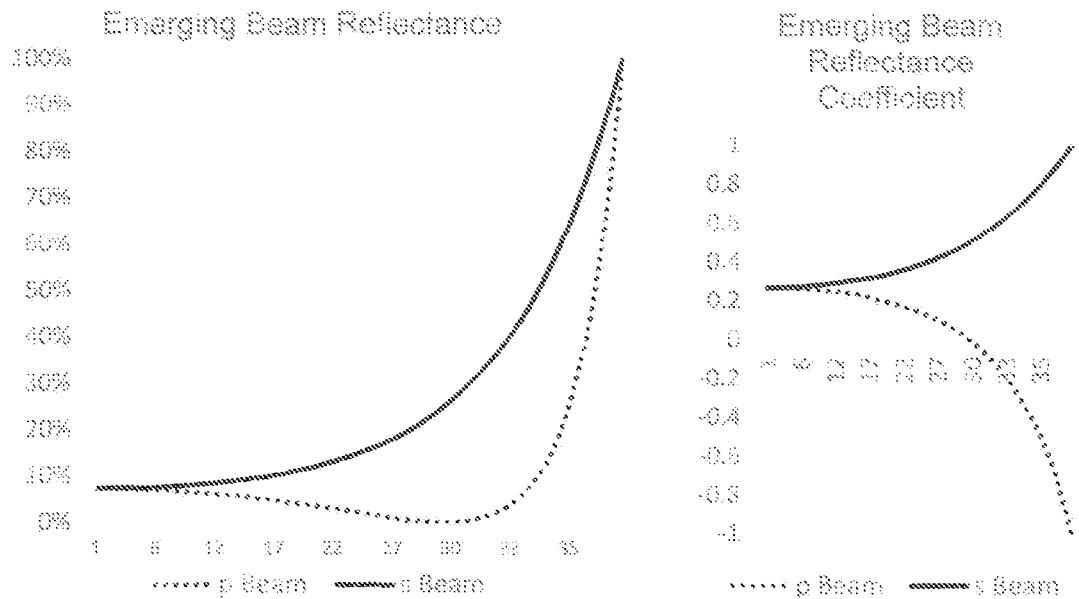
FIG. 13 illustrates Fresnel coefficients and amplitudes for a diamond-to-$SrF_2$ interface.

In an alternate embodiment, the dielectric layer (120) is comprised of $SrF_2$. FIG. 12 and FIG. 13 graphically demonstrate the Fresnel transmissive and reflective coefficients and intensities for a diamond optical media substrate (110)-to-$SrF_2$ dielectric (120) interface and the $SrF_2$ dielectric (120)-to-diamond optical media substrate (110) interface where $SrF_2$ exhibits an index of refraction of approximately 1.33 for an approximately 10 μm beam.

For a 'p' polarized beam, the $SrF_2$ Brewster Angle, when sandwiched between the optical media substrate (110) and overlayer (130), is approximately 29.4 degrees at the diamond optical media substrate (110)-to-$SrF_2$ dielectric (120) interface, and approximately 60.6 degrees at the $SrF_2$ dielectric (120)-to-DLC Overlayer (130) interface. These angles are less than approximately 7 degrees away from the Brewster Angles for the diamond optical media substrate (110)-to-Air (202) and DLC overlayer (130)-to-gas gain medium (201) interfaces, thus providing for low loss traversal of the 'p' polarized cavity transmitting laser beam (210) through the dielectric (120) when the thin film Brewster coupling device (100) is positioned at or near the Brewster Angle for the Optical media substrate (110)-to-Air (202) and closely matching Overlayer (130)-to-gas gain medium (201) interfaces.

The deviations from the Brewster Angles do lead to small reflections of the 'p' polarized cavity transmitting laser beam (210). However, as previously noted, not only are the two reflected components off the 'p' polarized cavity transmitting laser beams (212) and (214), extremely small, they are mutually coherent and substantially anti-phase with respect to each other, leading to an ignorably small net reflection, and thus minimal attributable loss, of the incident 'p' polarized cavity transmitting laser beam (210) from the thin film Brewster coupling device (100).

Figure 14:
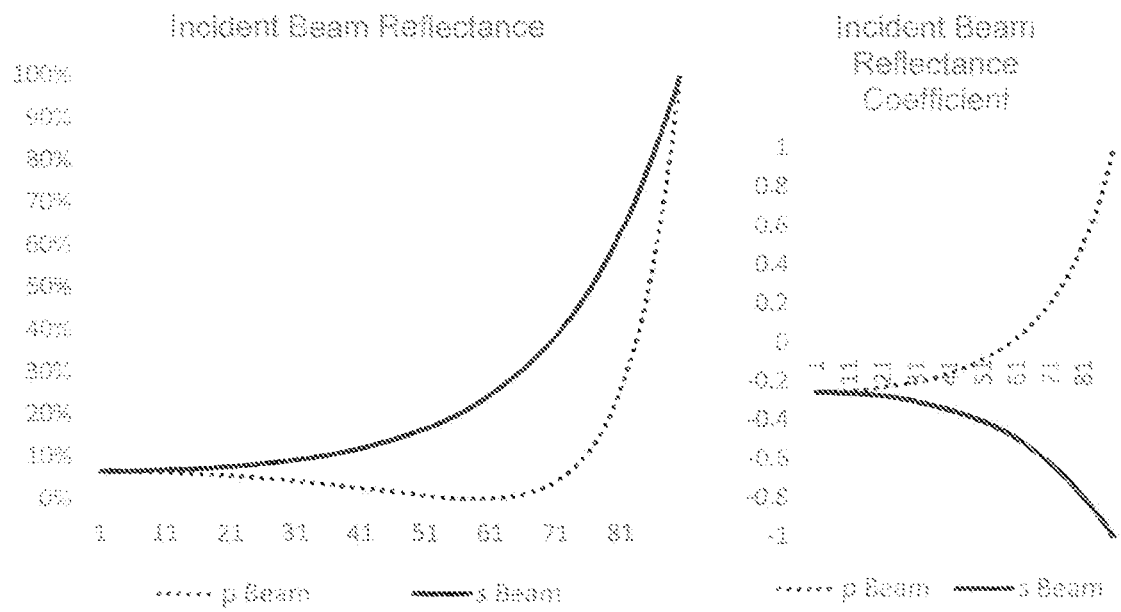
FIG. 14 illustrates Fresnel coefficients and amplitudes for a $BaF_2$-to-diamond interface.
Figure 15:
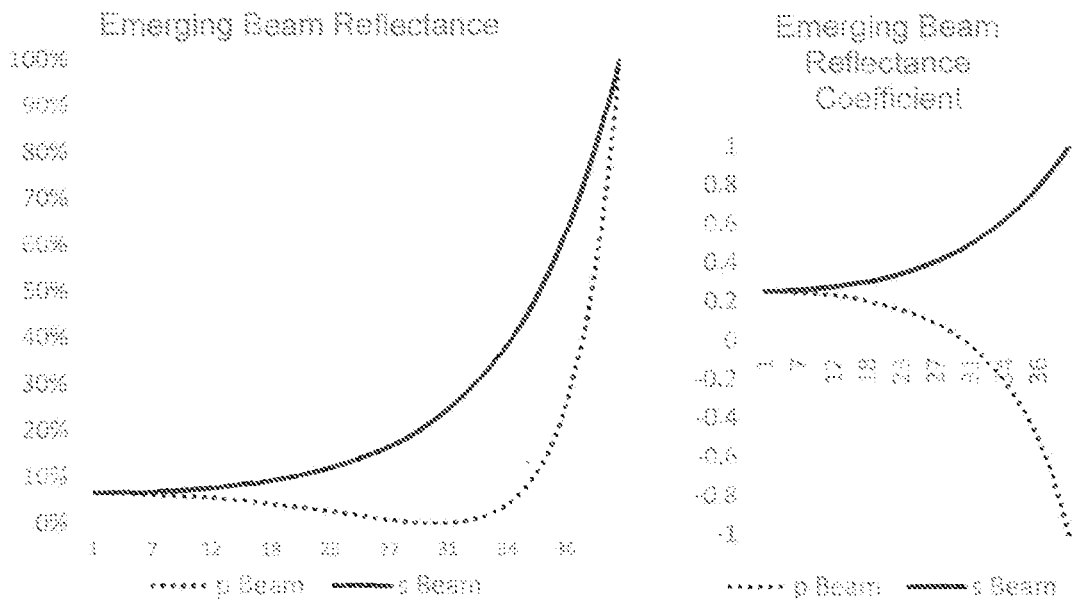
FIG. 15 illustrates Fresnel coefficients and amplitudes for a diamond-to-$BaF_2$ interface.

In an alternate embodiment, the dielectric layer (120) is comprised of $BaF_2$. FIG. 14 and FIG. 15 graphically demonstrate the Fresnel transmissive and reflective coefficients and intensities for a diamond optical media substrate (110)-to-$BaF_2$ dielectric (120) interface and the $BaF_2$ dielectric (120)-to-diamond optical media substrate (110) interface where $BaF_2$ exhibits an index of refraction of approximately 1.4 for an approximately 10 μm beam.

For a 'p' polarized beam, the $BaF_2$ Brewster Angle, when sandwiched between the optical media substrate (110) and overlayer (130), is approximately 30.5 degrees at the diamond optical media substrate (110)-to-$BaF_2$ dielectric (120) interface, and approximately 59.5 degrees at the $BaF_2$ dielectric (120)-to-DLC Overlayer (130) interface. These angles are less than approximately 8 degrees away from the Brewster Angles for the diamond optical media substrate (110)-to-Air (202) and DLC overlayer (130)-to-gas gain medium (201) interfaces, thus providing for low loss traversal of the 'p' polarized cavity transmitting laser beam (210) through the dielectric (120) when the thin film Brewster coupling device (100) is positioned at or near the Brewster Angle for the Optical media substrate (110)-to-Air (202) and closely matching Overlayer (130)-to-gas gain medium (201) interfaces.

The deviations from the Brewster Angles do lead to small reflections of the 'p' polarized cavity transmitting laser beam (210). However, as previously noted, not only are the two reflected components off the 'p' polarized cavity transmitting laser beams (212) and (214), extremely small, they are mutually coherent and substantially anti-phase with respect to each other, leading to an ignorably small net reflection, and thus minimal attributable loss, of the incident 'p' polarized cavity transmitting laser beam (210) from the thin film Brewster coupling device (100).

Regarding bulk absorption losses of the thin film Brewster coupling device (100), a typical structural example of the device would be a diamond optical media substrate (110) of approximately 0.5 mm thickness, and dielectric layer (120) and DLC overlayer (130) element layer thicknesses of hundreds of nanometers, being sized for reflection of the shorter wavelength pump beam. Thus, the thin film Brewster coupling device (100) exhibits minimal to insignificant absorption losses to both to the 's' polarized DPSS pump beam (220) and specifically the OPML 'p' polarized cavity transmitting laser beam (210) as required for the optically pumped molecular laser under consideration. Given the transmission related absorption loss tolerances previously articulated for the oscillator and amplifier deployment arrangements and the device layer thicknesses, one can then determine the maximum material extinction coefficients tolerable for the optical media substrate, dielectric layer and overlayer for each customized deployment type.

In an alternate embodiment, sensitizing layers, such as germanium or silicon, can be deposited between the overlayer (130) and dielectric layer (120) and the optical media substrate (110) at a thin several monolayers to nanometers scale for enhancing layer adhesion. Germanium and silicon are of the same periodic table family group as carbon, and are known to facilitate adhesion of diamond and DLCs to non-carbon-based molecular dielectric media. Again, any adhesion layers as defined and applied would present an insignificant optical thickness to the traversing beams as well as insignificant absorption losses. Their direct abutment to diamond or DLC, and very limited layer thickness, ensures extremely rapid thermal relaxation.

Figure 16:
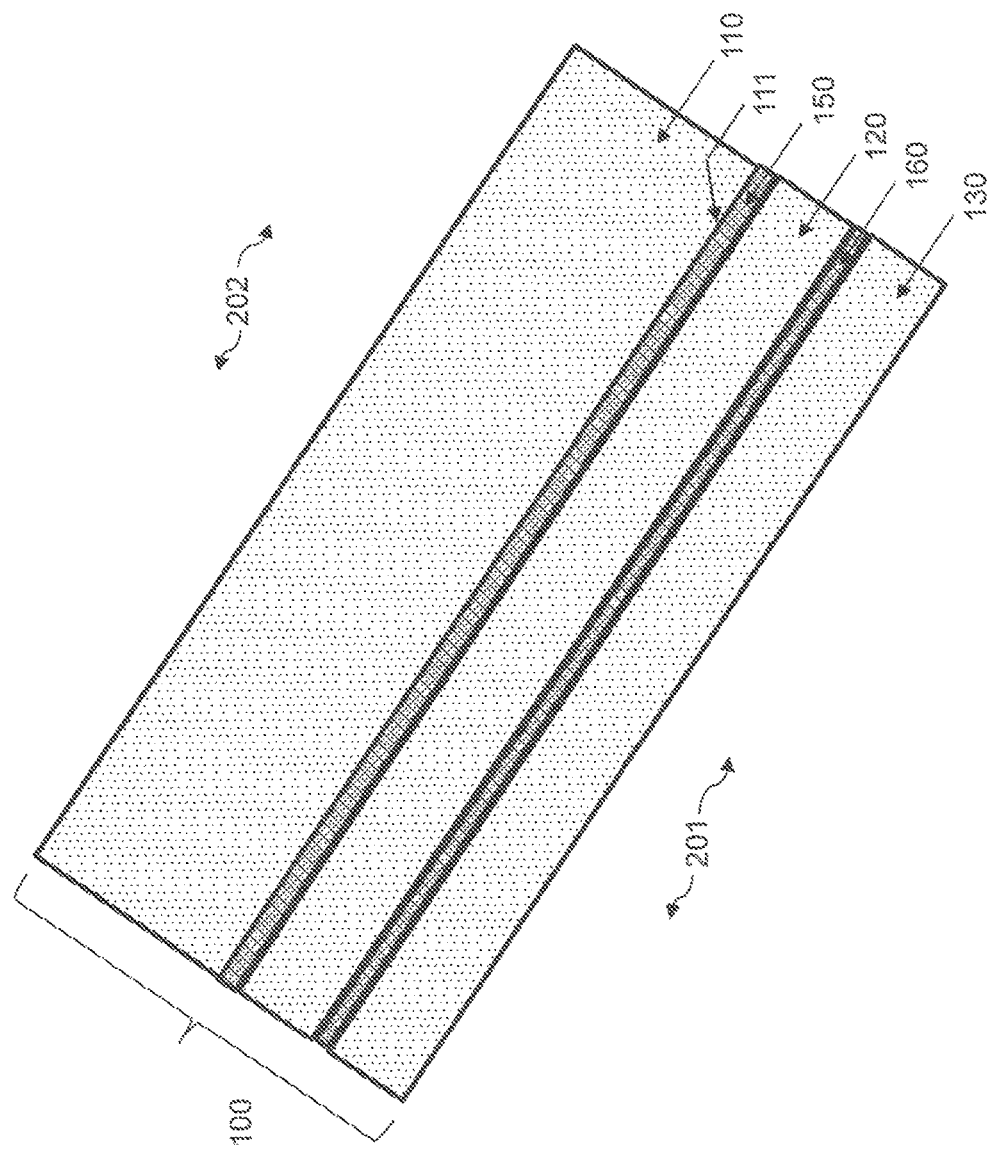
FIG. 16 illustrates an embodiment of the invention demonstrating sensitizing layers.

Additionally, for direct and sensitized assisted adhesion for identified media of this device, stable molecular species involving elements of molecules of the interacting layers concerned exist, and in most cases heats of formation are exothermic. These latter characteristics have also proven relevant in defining options presenting with acceptable adhesion. FIG. 16 illustrates adhesion assist layers (150) and (160) between the optical media substrate (110) and dielectric layer (120), and the dielectric layer (120) and overlayer (130), respectively.

When considering any of the alternate dielectric (120) material candidates, it is important to note that the previously described structure of the thin film Brewster coupling device (100) inherently lends itself to heat dissipation and distribution. The direct abutment of dielectric layers (120) to DLC layers (130) within the repetitive bilayer structure proposed, and on occasion directly to diamond optical media substrate (110), ensures such. The invention's stack configuration ensures that selected layers are optically thin to the 'p' polarized cavity beam (210), thus exploiting alternating phase change reflections to cancel undesired reflected 'p' polarized beam losses.

In addition, diamond, including DLC, possesses a relatively high reflective curve for 's' polarized beam at angular orientations around the Brewster Angle, that provides for a fairly broad window of allowable angular positioning of the thin film Brewster coupling device (100). This facilitates sufficient latitude to maximize reflectance of the initial and follow-on 's' polarized DPSS pump beam (220) reflections while preserving quality of the 'p' polarized cavity transmitting laser beam (210).

The 's' polarized DPSS pump beam (220) is introduced into the sealed gas tube (200) through the windows (250). Given the wavelengths concerned for a $CO_2$ laser pump beam, the windows (250) may be comprised of undoped YAG, sapphire or any other suitable material for the pump wavelengths concerned. Both sapphire and YAG as materials are singularly suitable as pressure cell containment windows. Their bulk losses, attenuation, of the proposed pump wavelengths will be negligible. Both are suited to employment of thin film AR coatings of demonstrated high LIDT at the wavelengths of interest and equally the windows (250) can be engineered at their own Brewster angles for the wavelengths concerned. Both are unsuitable for the approximately 8 μm to 11.5 μm OPML spectral range of interest, and thus disqualified as substrates for the TFP device under consideration.

It is to be understood that diamond, be it natural. CVD or PECVD, or by any other means generated. MgO, $PbF_2$, $BaF_2$ and $SrF_2$, and DLC are but a sample of example candidates identified as materials for the optical media substrate (110), dielectric layer (120) and overlayer (130) meeting the required performance parameters. It is therefore also to be understood that the disclosure is not limited to the materials described above, and the instant invention can be implemented with various materials as long as their performance falls within the technical scope of the disclosure.

What is claimed is:

1. A thin film Brewster coupling device for coincident path coupling and decoupling of an approximately 2 μm to approximately 4 μm wavelength 's' polarized pump beam with an approximately 8.5 μm to approximately 11.5 μm wavelength gas laser 'p' polarized imposed beam in a laser beam gain medium cavity having a gain medium gas, the device comprising:
    an optical media substrate comprising a front surface, and
    at least one dielectric stack optically coupled to the optical media substrate front surface; the dielectric stack comprising
    a dielectric layer, and
    an overlayer;
    wherein the optical media substrate:
        exhibits an index of refraction of at least 2 within the approximately 2 μm to approximately 11.5 μm wavelength range,
        exhibits an extinction coefficient near 0 within the approximately 2 μm to approximately 2.5 μm and the approximately 6 μm to approximately 11.5 μm wavelengths range,
        exhibits a thermal conductivity approximately 1,000 W/m-K or greater,
        exhibits a Youngs modulus of approximately 1,000 GPa or greater,
        exhibits a significant band gap energy,
        is chemically inert to the gain medium gas; and
    wherein the dielectric layer:
        comprises an optical thickness of approximately a quarter wavelength of the 's' polarized pump beam,
        exhibits an index of refraction of less than approximately 1.7 within the approximately 2 μm to approximately 11.5 μm wavelength range,
        exhibits an extinction coefficient less than approximately 0.01 within the approximately 2 μm to approximately 11.5 μm wavelength range; and
    wherein the overlayer
        comprises an optical thickness of approximately a quarter wavelength of the 's' polarized pump beam,
        exhibits an index of refraction of at least 2 within the approximately 2 μm to approximately 11.5 μm wavelength range,
        exhibits an extinction coefficient near 0 within the approximately 2 μm to approximately 11.5 μm wavelength range,
        exhibits a thermal conductivity of 500 W/m-K or greater,
        exhibits a Youngs modulus of approximately 500 GPa or greater,
        exhibits a significant band gap energy,
        is chemically inert to the gain medium gas.

2. The thin film Brewster coupling device of claim 1, wherein the device is positioned such that the gas laser 'p' polarized imposed beam is incident on the device at an angle that is nominally equal to the air-to-optical media substrate Brewster angle to the normal of the optical media substrate front surface.

3. The thin film Brewster coupling device of claim 2, wherein nominally equal is within plus or minus approximately 5 degrees.

4. The thin film Brewster coupling device of claim 1, wherein the optical media substrate comprises diamond.

5. The thin film Brewster coupling device of claim 4, wherein the diamond optical media substrate comprises single crystal diamond.

6. The thin film Brewster coupling device of claim 4, wherein the diamond optical media substrate comprises polycrystalline diamond.

7. The thin film Brewster coupling device of claim 1, wherein the dielectric layer of the at least one dielectric stack exhibits a decaying index of refraction as wavelength increases between approximately 2 µm to approximately 11.5 µm.

8. The thin film Brewster coupling device of claim 1, wherein the dielectric layer of the at least one dielectric stack comprises one of MgO, $PbF_2$, $BaF_2$ and $SrF_2$.

9. The thin film Brewster coupling device of claim 1, wherein the overlayer of the at least one dielectric stack is comprised of a diamond-like coating.

10. The thin film Brewster coupling device of claim 1, wherein the overlayer of the at least one dielectric stack exhibits an index of refraction of within plus or minus approximately 0.4 of the index of refraction of the optical media substrate.

11. The thin film Brewster coupling device of claim 1, wherein the dielectric layer comprises an adhesion sensitizing layer on at least one side for adhesion to the adjacent optical media substrate or overlayer.

12. The thin film Brewster coupling device of claim 11, wherein the dielectric stack adhesion sensitizing layer comprises Germanium.

13. The thin film Brewster coupling device of claim 11, wherein the dielectric stack adhesion sensitizing layer comprises Silicon.

14. A thin film Brewster coupling device for coincident path coupling and decoupling of an approximately 2 µm to approximately 4 µm wavelength 's' polarized pump beam with an approximately 8.5 µm to approximately 11.5 µm wavelength gas laser 'p' polarized imposed beam in a laser beam gain medium cavity having a gain medium gas, the device comprising:
    an optical media substrate comprising a front surface, and
    at least one dielectric stack optically coupled to the optical media substrate front surface; the dielectric stack comprising
    a dielectric layer, and
    an overlayer;
    wherein the optical media substrate:
        exhibits an index of refraction of at least 2 within the approximately 2 µm to approximately 11.5 µm wavelength range,
        exhibits a thermal conductivity approximately 1,000 W/m-K or greater,
        exhibits a Youngs modulus of approximately 1,000 GPa or greater,
        exhibits a significant band gap energy,
        is chemically inert to the gain medium gas; and
    wherein the dielectric layer:
        comprises an optical thickness of approximately a quarter wavelength of the 's' polarized pump beam,
        exhibits an index of refraction of less than approximately 1.7 within
        the approximately 2 µm to approximately 11.5 µm wavelength range; and
    wherein the overlayer
        comprises an optical thickness of approximately a quarter wavelength of the 's' polarized pump beam,
        exhibits an index of refraction of at least 2 within the approximately 2 µm to approximately 11.5 µm wavelength range,
        exhibits a thermal conductivity of approximately 500 W/m-K or greater,
        exhibits a Youngs modulus of approximately 500 GPa or greater,
        exhibits a significant band gap energy,
        is chemically inert to the gain medium gas, and
    wherein the extinction coefficients of the optical media substrate, the dielectric layer and the overlayer, collectively, are such that the transmission absorption losses of the thin film Brewster coupling device are less than approximately 5 percent of the incident approximately 8.5 µm to approximately 11.5 µm wavelength beam.

15. The thin film Brewster coupling device of claim 14, wherein the extinction coefficients of the optical media substrate, the dielectric layer and the overlayer, collectively, are such that the absorption losses of the thin film Brewster coupling device are less than 0.5 percent of the incident approximately 8.5 µm to approximately 11.5 µm wavelength beam.

* * * * *